United States Patent
Hasegawa et al.

(10) Patent No.: US 10,191,594 B2
(45) Date of Patent: Jan. 29, 2019

(54) PROJECTION-TYPE VIDEO DISPLAY DEVICE

(71) Applicant: MAXELL, LTD., Kyoto (JP)

(72) Inventors: Minoru Hasegawa, Tokyo (JP); Mitsuo Nakajima, Tokyo (JP); Takashi Matsubara, Tokyo (JP); Sakiko Narikawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/889,817

(22) Filed: Feb. 6, 2018

(65) Prior Publication Data

US 2018/0164951 A1 Jun. 14, 2018

Related U.S. Application Data

(63) Continuation of application No. 15/037,164, filed as application No. PCT/JP2013/081131 on Nov. 19, 2013, now Pat. No. 9,927,923.

(51) Int. Cl.
G06F 3/042 (2006.01)
G06F 3/048 (2013.01)
(Continued)

(52) U.S. Cl.
CPC ............ *G06F 3/0425* (2013.01); *G06F 3/017* (2013.01); *G06F 3/0346* (2013.01); *G06F 3/048* (2013.01);
(Continued)

(58) Field of Classification Search
CPC ...... G06F 3/0425; G06F 3/048; G06F 3/0346; G06F 3/0488; G06F 3/04886; H04N 9/31;
(Continued)

(56) References Cited

U.S. PATENT DOCUMENTS 9,354,809 B2 * 5/2016 Asahara ................ B63B 49/00
9,582,188 B2 2/2017 Kim
(Continued)

FOREIGN PATENT DOCUMENTS

JP 08-320921 A 12/1996
JP 2005-148555 A 6/2005
(Continued)

OTHER PUBLICATIONS

Japanese Office Action dated May 23, 2017 in the Japanese Application No. 2016-138450.

*Primary Examiner* — Antonio Xavier
(74) *Attorney, Agent, or Firm* — Volpe and Koenig, P.C.

(57) ABSTRACT

In a projection-type video display device that displays an image by projecting the image onto a projection object starting from a desk surface, a display screen on which a position and a gesture operation of a user are reflected is displayed in a predetermined area. An illumination and a camera are disposed in the projection-type video display device installed on the desk surface, a gesture using user's fingers is detected, and, for example, a menu screen and an operation guide are displayed according to the gesture. The shadows of the fingers are photographed by the camera, and a gesture is detected. According to the gesture, the display screen is moved, rotated, divided, or enlarged/reduced, or a menu screen is displayed. The display direction is determined in consideration of the direction of sides of the desk.

4 Claims, 32 Drawing Sheets

(51) Int. Cl.
*G06F 3/0488* (2013.01)
*G09G 5/00* (2006.01)
*G09G 5/36* (2006.01)
*H04N 5/74* (2006.01)
*G06F 3/0346* (2013.01)
*H04N 9/31* (2006.01)
*G06F 3/01* (2006.01)
*G06F 3/0484* (2013.01)

(52) U.S. Cl.
CPC .......... *G06F 3/0426* (2013.01); *G06F 3/0488* (2013.01); *G06F 3/04845* (2013.01); *G06F 3/04883* (2013.01); *G09G 5/00* (2013.01); *G09G 5/36* (2013.01); *H04N 5/74* (2013.01); *H04N 9/31* (2013.01); *H04N 9/3185* (2013.01); *H04N 9/3194* (2013.01); *G06F 3/04886* (2013.01); *G06F 2203/04101* (2013.01); *G06F 2203/04808* (2013.01)

(58) Field of Classification Search
CPC ...... H04N 5/74; H04N 9/3185; H04N 9/3194; G09G 5/00; G09G 5/36
See application file for complete search history.

(56) References Cited

U.S. PATENT DOCUMENTS

| | | |
|---|---|---|
| 2003/0076343 A1 | 4/2003 | Fishkin |
| 2004/0108990 A1 | 6/2004 | Lieberman |
| 2009/0128716 A1 | 5/2009 | Nagashima |
| 2009/0244376 A1 | 10/2009 | Asano et al. |
| 2010/0245685 A1 | 9/2010 | Onodera et al. |
| 2010/0315413 A1* | 12/2010 | Izadi ................... G06F 3/017 345/419 |
| 2011/0169746 A1 | 7/2011 | Kitajima |
| 2011/0185300 A1* | 7/2011 | Hinckley ............ G06F 3/03545 715/769 |
| 2012/0098865 A1* | 4/2012 | Takano ................. G03B 21/26 345/660 |
| 2012/0127109 A1* | 5/2012 | Nishio ................ G06F 3/04883 345/173 |
| 2012/0236026 A1 | 9/2012 | Hinckley et al. |
| 2013/0009914 A1 | 1/2013 | Kano et al. |
| 2013/0083072 A1 | 4/2013 | Yoshino |
| 2014/0253513 A1 | 9/2014 | Matsubara |

FOREIGN PATENT DOCUMENTS

| | | |
|---|---|---|
| JP | 2005-318268 A | 11/2005 |
| JP | 2007-257220 A | 10/2007 |
| JP | 2009-064109 A | 3/2009 |
| JP | 2009-070245 A | 4/2009 |
| JP | 2009-237337 A | 10/2009 |
| JP | 2009-250772 A | 10/2009 |
| JP | 2010-237347 A | 10/2010 |
| JP | 2010-243576 A | 10/2010 |
| JP | 2011-028402 A | 2/2011 |
| JP | 2011-043876 A | 3/2011 |
| JP | 2012-068690 A | 4/2012 |
| JP | 2012-104096 A | 5/2012 |
| JP | 2012-113653 A | 6/2012 |
| JP | 2012-185630 A | 9/2012 |
| JP | 2012-194915 A | 10/2012 |
| JP | 2012-238293 A | 12/2012 |
| JP | 2013-076924 A | 4/2013 |
| JP | 2013-114647 A | 6/2013 |
| JP | 2013-148802 A | 8/2013 |
| WO | 2011/118313 A1 | 9/2011 |
| WO | 2012/120958 A1 | 9/2012 |
| WO | 2011/013400 A1 | 1/2013 |
| WO | 2013/051052 A1 | 4/2013 |
| WO | WO2013/051052 * | 4/2013 ............. G06F 3/048 |

* cited by examiner

F I G. 4 A
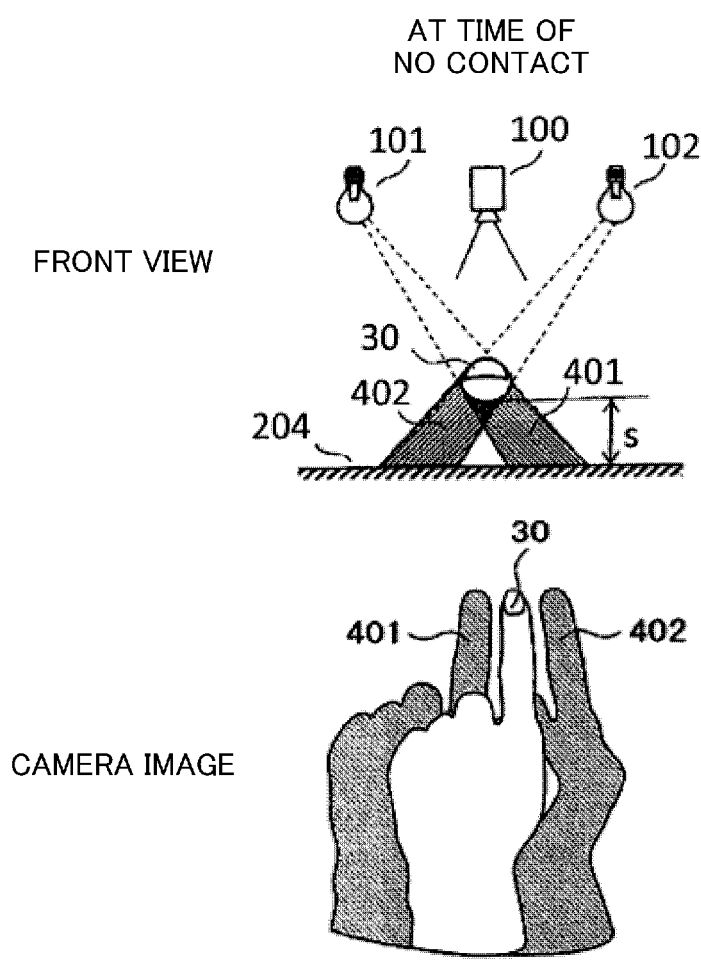

CASE OF PLURALITY OF FINGERS

DETERMINATION OF
POINTING DIRECTION

USE INNER CONTOUR LINE

USE OUTER CONTOUR LINE

MIDLINE OF CONTOUR LINE

FIG. 12B

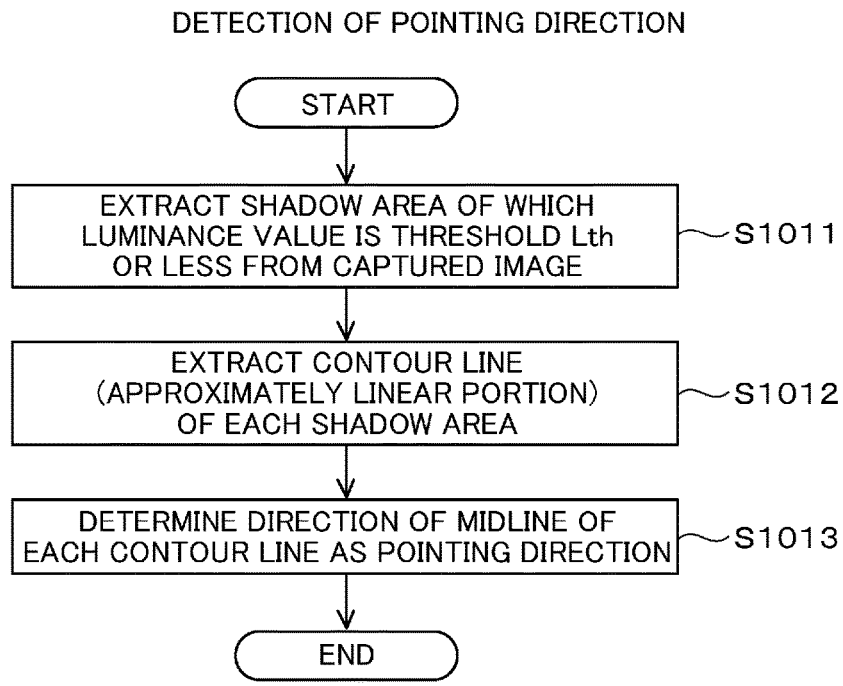

DETECTION OF POINTING DIRECTION

FIG. 13

| APPROACHING DEGREE A BETWEEN FINGER AND OPERATION FACE | OPERATION MODE SWITCHING | POINTER DISPLAY SWITCHING |
|---|---|---|
| LEVEL 5 | CONTACT OPERATION MODE | DISPLAY IS PRESENT |
| LEVEL 4 | AIR OPERATION MODE | DISPLAY IS PRESENT |
| LEVEL 3 | AIR OPERATION MODE | NO DISPLAY IS PRESENT |
| LEVEL 2 | OPERATION-OFF MODE | NO DISPLAY IS PRESENT |
| LEVEL 1 | OPERATION-OFF MODE | NO DISPLAY IS PRESENT |

CORRECTION OF
POINTER DISPLAY POSITION

CORRECTION OF
POINTER DISPLAY DIRECTION

CORRECTION OF
CONTACT POINT
(P→P'')

F I G. 1 9
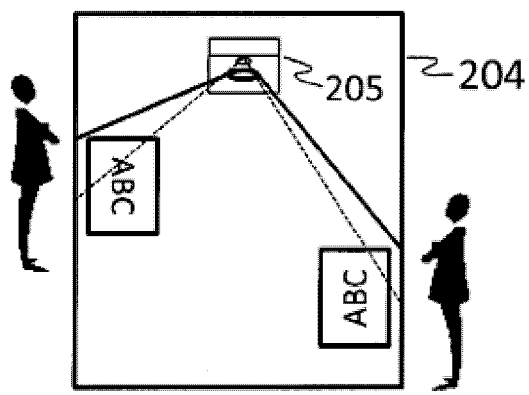
F I G. 2 0
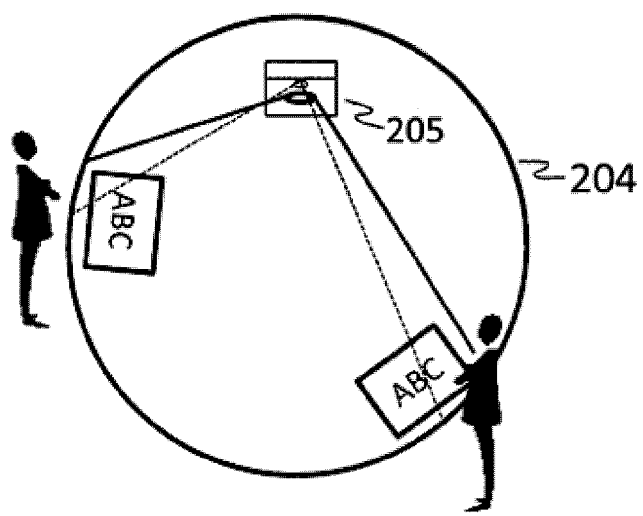

F I G. 2 1 A
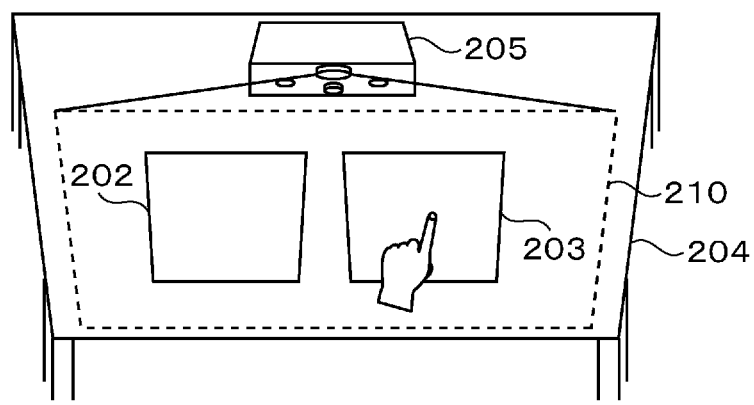
F I G. 2 1 B
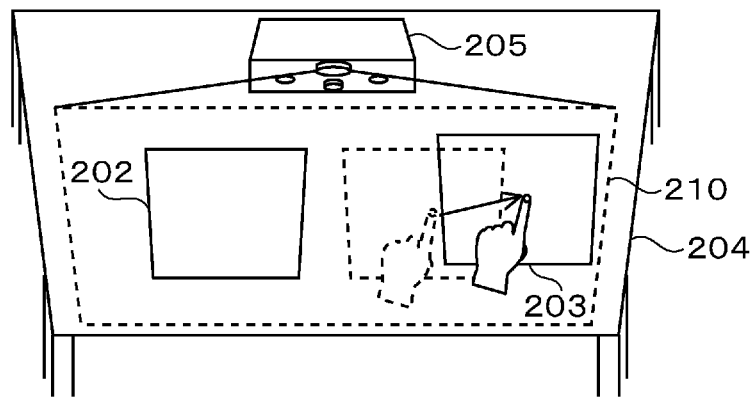

F I G. 2 3 A
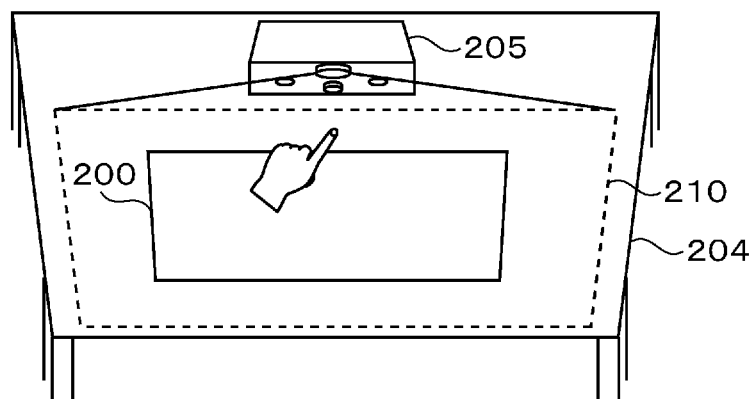
F I G. 2 3 B
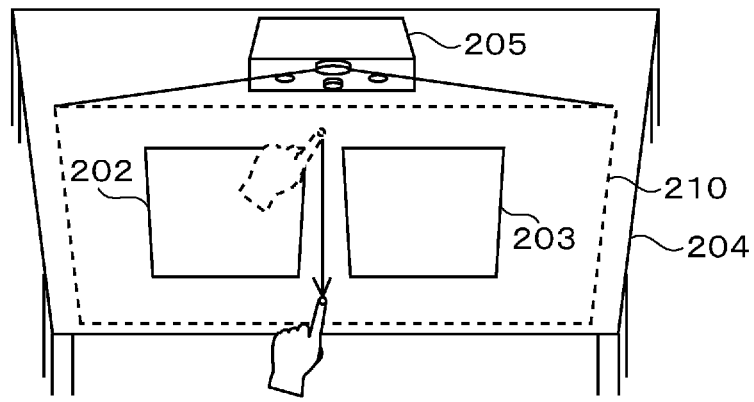

F I G. 3 1 D
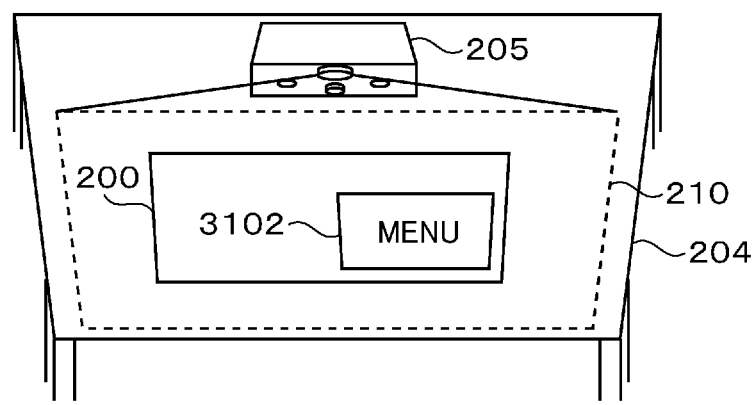
F I G. 3 2 A
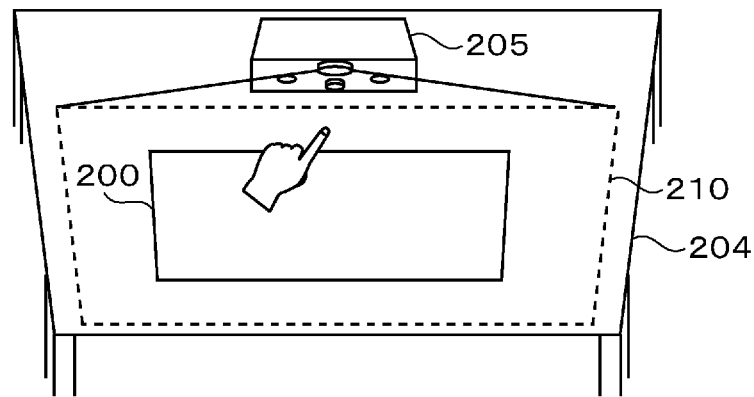

F I G. 3 2 B
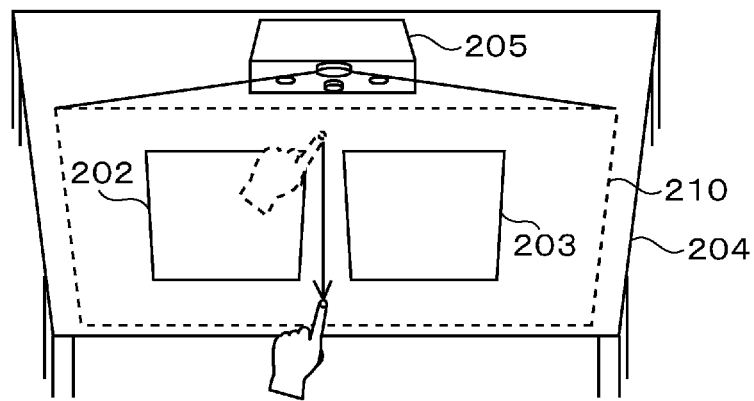
F I G. 3 2 C
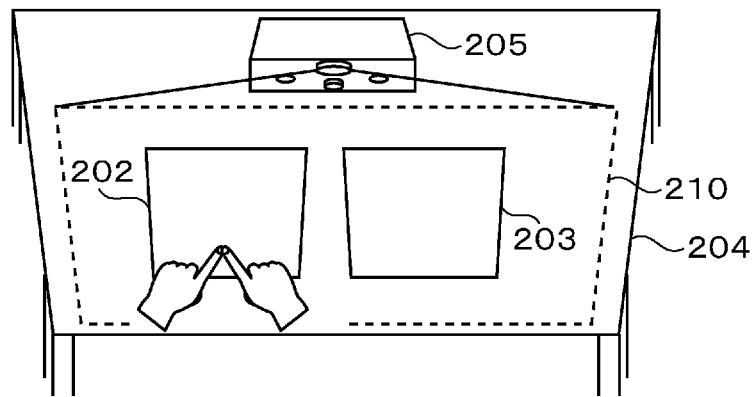

F I G. 3 4 A
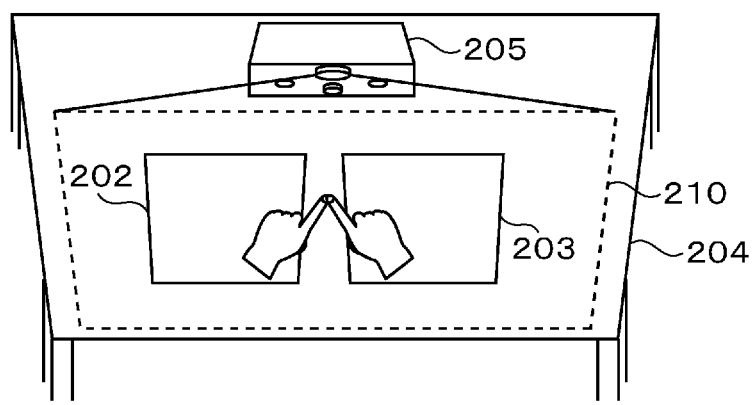
F I G. 3 4 B
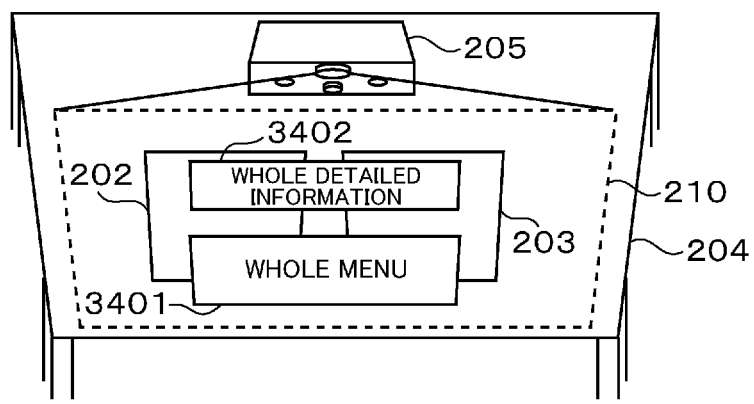

PROJECTION-TYPE VIDEO DISPLAY DEVICE

CROSS REFERENCE TO RELATED APPLICATIONS

This application is a continuation of U.S. patent application Ser. No. 15/037,164, filed May 17, 2016, which is incorporated by reference as if fully set forth therein.

TECHNICAL FIELD

The present invention relates to a projection-type video display device that projects an image.

BACKGROUND ART

A technology for controlling of a display direction to be a direction in which a video can be easily seen by a user when a projection-type display device projects the video onto a horizontal face such as a desk has been devised.

In Patent Document 1, a technology has been disclosed in which a projection-type display device disposed on the upper side of a projection object includes an imaging unit, a user interface image capturing an operator's motion is acquired, and a display screen is controlled based on a detection result of the motion.

In addition, in Patent Document 2, a method has been disclosed in which a display device disposed on the upper side of a projection object recognizes the position and the motion of a user and the shape of a projection object and a display position, a display direction, and the like are controlled in accordance therewith.

CITATION LIST

Patent Document

Patent Document 1: JP 2009-64109 A
Patent Document 2: JP 2013-76924 A

SUMMARY OF THE INVENTION

Problems to be Solved by the Invention

In the technologies disclosed in Patent Documents 1 and 2, it is intended to display a video on a projection object such as a desk that is easily movable from a display device disposed on the upper side of the projection object, and there is a problem in usability such as the necessity of movement of the display device according to the movement of the projection object.

In addition, in order to recognize the position, the operation, and the like of a user, a point to be photographed for recognizing the operation is located far from an imaging unit of the display device disposed on the upper side, and a point to be photographed is blocked by a part of user's body to make it difficult to photograph the point, whereby there is a problem in the accuracy of the recognition.

Furthermore, in recognizing the position, the operation, and the like of a user and improving the usability of the display device using a result of the recognition, it is considered that there is room for further improvement.

Solutions to Problems

In order to solve the problems described above, according to the present invention, there is provided a projection-type video display device including: a video projection unit that projects a video; at least one lighting unit that emits illumination light different from that of the projected video onto a surface at least partly overlapping a video projection surface onto which the video projection unit projects the video; an imaging unit that performs imaging using reflected light of the illumination light; a detection unit that detects at least a position at which an operator's finger is brought into contact with the video projection surface based on a captured image acquired by the imaging unit; and a display control unit that performs control such that at least one partial video including the video projected by the video projection unit is changed based on a result of the detection acquired by the detection unit.

In addition, the projection-type video display device may be installed on the video projection surface and project the video.

Effects of the Invention

According to the present invention, a projection-type video display device having improved usability can be provided, and there is an effect of contributing to the wide use of the device.

BRIEF DESCRIPTION OF THE DRAWINGS

FIG. 4A is a diagram that illustrates the shapes of the shadows of user's fingers generated by two illuminations.

FIG. 12B is a diagram that illustrates a process flow of an operation detecting method.

FIG. 13 is a diagram that illustrates an example of control according to the approaching degree of a finger.

FIG. 19 is a diagram that illustrates an example in which a display position and a display direction are determined by detecting a plurality of persons present near a rectangular desk.

FIG. 20 is a diagram that illustrates an example in which a display position and a display direction are determined by detecting a plurality of persons present near a circular desk.

FIG. 21A is a diagram that illustrates an example of parallel movement using a finger operation.

FIG. 21B is a diagram that illustrates an example of parallel movement using a finger operation.

FIG. 23A is a diagram that illustrates an example of an operation of increasing the number of display screens using a finger operation.

FIG. 23B is a diagram that illustrates an example of an operation of increasing the number of display screens using a finger operation.

FIG. 31D is a diagram that illustrates an example of an operation of a menu or a detailed information display.

FIG. 32A is a diagram that illustrates an example of an operation of a menu or a detailed information display.

FIG. 32B is a diagram that illustrates an example of an operation of a menu or a detailed information display.

FIG. 32C is a diagram that illustrates an example of an operation of a menu or a detailed information display.

FIG. 34A is a diagram that illustrates an example of an operation of a menu or a detailed information display.

FIG. 34B is a diagram that illustrates an example of an operation of a menu or a detailed information display.

MODE FOR CARRYING OUT THE INVENTION

Hereinafter, embodiments of the present invention will be described with reference to the drawings.

First Embodiment

Figure 1:
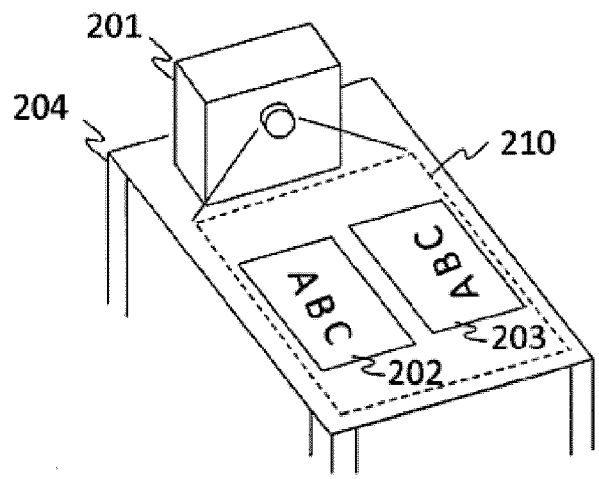
FIG. 1 is a diagram that illustrates an example in which a video is projected onto a desk using a projection-type display device disposed on the desk.

FIG. 1 illustrates an example in which two videos 202 and 203 having mutually-different rotation angles are projected onto a desk for a plurality of users facing mutually-different directions by using a projection-type display device 201 disposed on the desk. In description presented above, while an example in which a video is projected onto a "desk" is described, the "desk" is an example of a video projection surface. Thus, this embodiment may have any other video projection surface (may be a surface or a floor of any other structure) as its target. By installing the projection-type display device 201 on the desk, the adjustment of the position of the projection-type display device 201 at the time of moving the desk is basically unnecessary.

In FIG. 1, a maximum range 210 in which the projection-type display device 205 can optically project an image is illustrated using broken lines. The maximum projection range 210 may be illustrated in drawings described below. For example, the projection-type display device 205 projects two display screens 202 and 203 within the maximum projection range 210. The display screens 202 and 203 correspond to a screen of on screen display (OSD) to be described later. In other words, images displayed on the display screens 202 and 203 are partial images within the maximum projection range 210.

For example, a way to use is considered in which, for a person present on the periphery of the desk, a design diagram of a device is displayed in the whole maximum projection range 210, and an explanatory document of the design diagram is displayed on the display screens 202 and 203.

Figure 2:
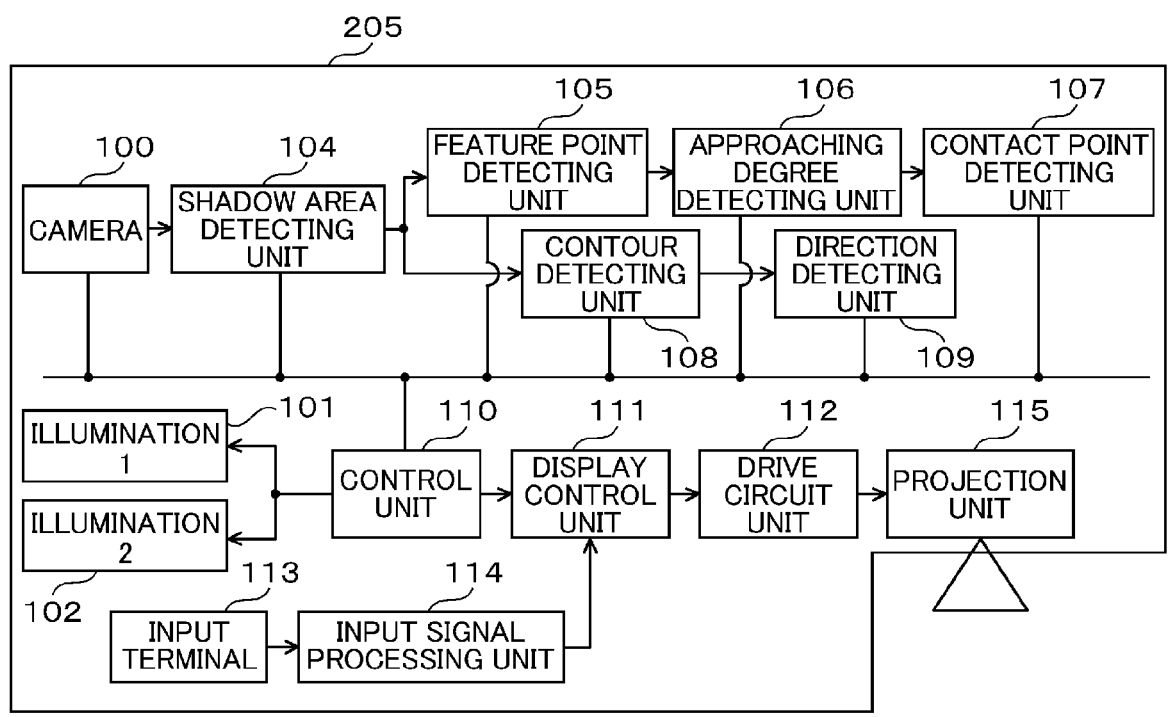
FIG. 2 is a diagram that illustrates an example of the configuration of a projection-type display device provided with an operation detecting function controlling a display screen using a gesture input.

FIG. 2 illustrates an example of a configuration diagram of a projection-type display device 205 provided with an operation detecting function of which a display screen is controlled by a user through a gesture input. The projection-type display device 205 provided with the operation detecting function includes: a camera 100; two illuminations 101 and 102; a shadow area extracting unit 104; a feature point detecting unit 105; an approaching degree detecting unit 106; a contact point detecting unit 107; a contour detecting unit 108; a direction detecting unit 109; a control unit 110; a display control unit 111; a drive circuit unit 112; an input terminal 113; an input signal processing unit 114; and a projection unit 115. The control unit 110 generates detection result data of operation states such as an approaching degree of a finger with respect to an operation surface, the coordinates of a contact point, a pointing direction, and the like detected by the detection units.

In addition, the display control unit 111 generates display control data such as an operation mode, a pointer display position, a pointer display direction, and the like based on the detection results and performs a process based on the display control data for a video signal passing through the input terminal 113 and the input signal processing unit 114. A process that is necessary for the projection is performed by the drive circuit unit 112 for a processed video signal, and a resultant video signal is projected from the projection unit 115 to a projection object. In FIG. 2, while a buffer, a memory, and the like are not illustrated, a buffer, a memory, and the like that are necessary may be appropriately mounted.

Figure 3:
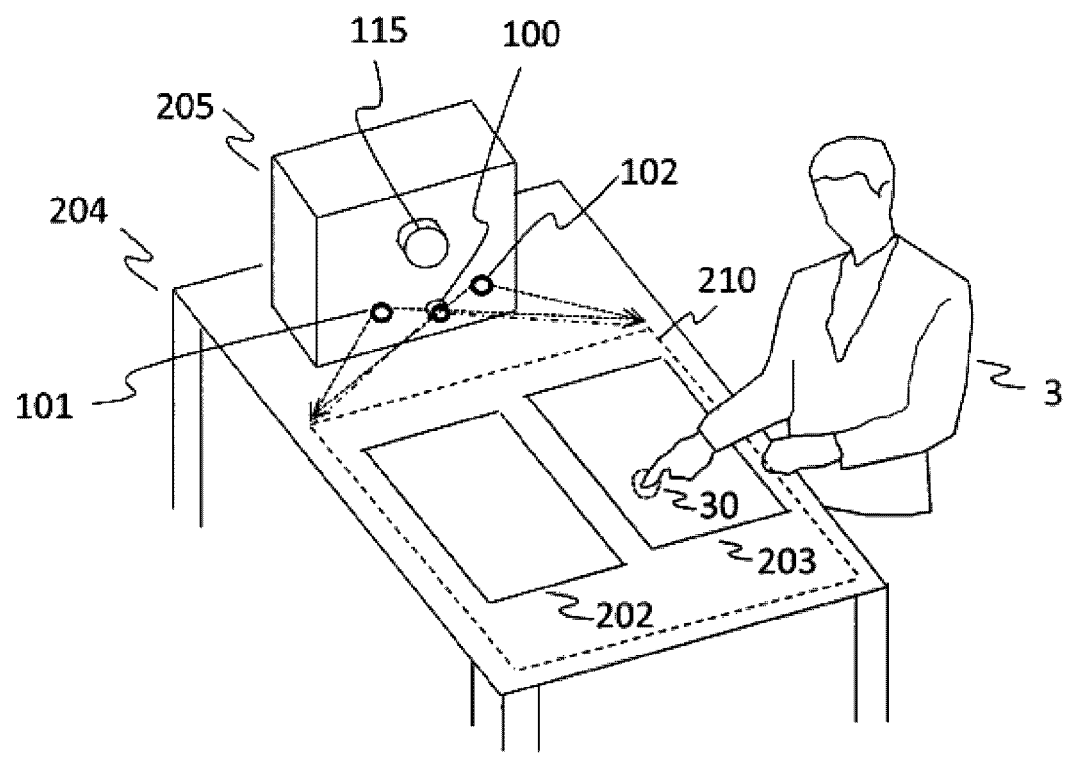
FIG. 3 is a diagram that illustrates an example of a state in which a user performs an operation for a display screen of the projection-type display device provided with the operation detecting function.

FIG. 3 is a diagram that illustrates an example of a state in which a user 3 performs an operation for a display screen 203 of a projection-type display device 205 provided with the operation detecting function. The user 3 causes a finger 30, which is an operation unit, to approach the display screen 203 of a projection object 204 and to be in contact with a certain position, thereby performing a desired operation. In other words, for example, the display screen 203 of the projection object 204 that is a desk surface is also an operation surface used for the user 3 to perform an operation for the projection-type display device 205. The operation performed by the user 3 will be described later in detail.

The projection-type display device 205 provided with the operation detecting function includes two illuminations 101 and 102 and a camera 100. The two illuminations 101 and 102 irradiate the finger 30 of the user 3, and the camera 100 images the finger 30 and the proximity thereof. When the finger 30 approaches or is brought into contact with the projection object 204, the shape of the shadow of the finger 30 changes. Accordingly, the projection-type display device 205 analyses an image acquired by the camera 100, thereby detecting the approaching degree, the contact point, and the pointing direction of the finger.

In addition, by installing the projection-type display device 205 provided with the operation detecting function on the desk, a chance for blocking light when the illuminations 101 and 102 irradiate the finger 30 can be reduced.

Next, an example of the operation of each unit of the projection-type display device 205 provided with the operation detecting function illustrated in FIG. 2 will be described. The camera 100 is configured by an image sensor, a lens, and the like and captures an image including the finger 30 that is the operation unit of the user 3. Each of the two illuminations 101 and 102 is configured by a light emitting diode, a circuit board, a lens, and the like and projects the shadow of the finger 30 within an image captured by the camera 100 by emitting illumination light to the projection object 204 and the finger 30 of the user 3.

It may be configured such that each of the illuminations 101 and 102 is an infrared lamp, and the camera 100 is an infrared camera. In such a case, an infrared image captured by the camera 100 can be acquired separately form a visible-light video that is a video of a video signal projected from the projection-type display device 205 provided with the operation detecting function. In addition, illumination light and imaging light may be a non-visible ray that can be separated from a projection video projected from the projection-type display device 205, and thus, ultraviolet light other than the infrared light may be used.

The shadow area extracting unit 104 generates a shadow image by extracting a shadow area from an image acquired from the camera 100. For example, it may be configured such that a differential image is generated by subtracting a background image of the projection object 204, which has been captured in advance, from a captured image captured at the time of detecting an operation, the luminance values of the differential image are binarized using a predetermined threshold Lth, and an area of which the luminance value is the threshold or less is set as a shadow area. In addition, a so-called labeling process in which shadow areas not connected to each other among extracted shadows are identified as different shadows is performed. According to the labeling process, fingers to which a plurality of the extracted shadows correspond can be determined, in other words, two shadows forming a pair corresponding to one finger can be identified.

The feature point detecting unit 105 detects a specific position (hereinafter referred to as a feature point) within a shadow image extracted by the shadow area extracting unit 104. For example, as the feature point, a tip end position (corresponding to a fingertip position) within a shadow image is detected. In order to detect a feature point, while various techniques are used, in case of a tip end position, the tip end position can be detected from coordinate data of pixels configuring the shadow image, or a portion matching a unique shape of the feature point can be detected through image recognition or the like. Since one feature point is detected from one shadow, two feature points are detected for one finger (two shadows).

The approaching degree detecting unit 106 measures a distance d between two feature points detected by the feature point detecting unit 105 and detects a space s (approaching degree A) between the finger and the operation surface based on the distance d. Accordingly, it is determined whether or not the finger is brought into contact with the operation surface.

In a case where the finger is determined to be brought into contact with the operation surface by the approaching degree detecting unit 106, the contact point detecting unit 107 detects a contact point of the finger for the operation surface based on the position of the feature point and calculates the coordinates thereof.

The contour detecting unit 108 extracts the contour of a shadow area from the shadow image extracted by the shadow area extracting unit 104. For example, a start pixel of contour tracing is determined by scanning the inside of the shadow image in a constant direction, and neighboring pixels of the start pixel are traced in a counterclockwise direction, whereby the contour is acquired.

The direction detecting unit 109 extracts segments each having an almost linear shape from the contour line detected by the contour detecting unit 108. Then, based on the direction of the extracted contour line, the pointing direction of the finger on the operation surface is detected.

The process of each detection unit described above is not limited to the technique described above, but an algorithm of another image processing may be used. The detection unit described above may be configured not only by hardware using a circuit board but also by software.

The control unit 110 generates detection result data such as the approaching degree, the coordinates of a contact point, the pointing direction, and the like of the finger for the operation surface, which are detected by the detection units, by controlling the overall operation of the device.

The display control unit 111 generates display control data such as an operation mode, a pointer position, a pointer direction, and the like based on the detection result data such as the approaching degree, the coordinates of the contact point, the pointing direction, and the like of the finger generated by the control unit 110 and performs a process based on the display control data for a video signal passing through the input terminal 113 and the input signal processing unit 114.

The drive circuit unit 112 performs a process used for projecting the processed video signal as a display video. The display image is projected onto the projection object from the projection unit 115.

While the units described up to here have been described to be equipped in one projection-type display device 205 provided with the operation detecting function as an example, some thereof may be configured as separate units and be connected using a transmission line.

Figure 4B:
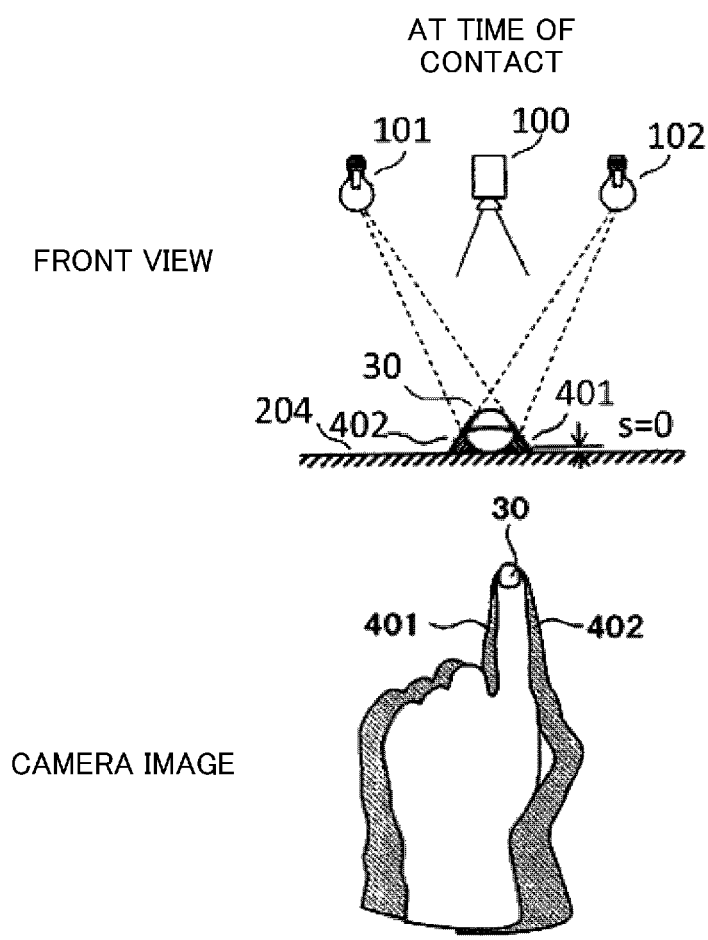
FIG. 4B is a diagram that illustrates the shapes of the shadow of user's fingers generated by two illuminations.

FIGS. 4A and 4B are diagrams that illustrate the shapes of shadows of a user's finger generated by two illuminations. FIG. 4A illustrates a state in which the finger 30 and the projection object 204 are not brought into contact with each other, and FIG. 4B illustrates a state in which the finger and the projection object are brought into contact with each other.

As illustrated in FIG. 4A, in the state (space s) in which the finger 30 is not brought into contact with the projection object 204, light from two illuminations 101 and 102 is blocked by the finger 30, and shadows 401 and 402 (denoted by diagonal lines) are formed. In a camera image, the two shadows 401 and 402 are present to be separate to both sides of the finger 30.

On the other hand, as illustrated in FIG. 4B, in the state (space s=0) in which the fingertip of the finger 30 is brought into contact with the projection object 204, two shadows 401 and 402 are present to approach each other at the position of the fingertip of the finger 30. While partial areas of the shadows 401 and 402 are hidden in the shade of the finger 30, the hidden portions are not included in the shadow areas. In this embodiment, a contact between the finger 30 and the projection object 204 is determined by using a property of a space (particularly, a distance between feature points) between the shadow 401 and the shadow 402 approaching each other when the finger 30 approaches the projection object 204.

Figure 5:
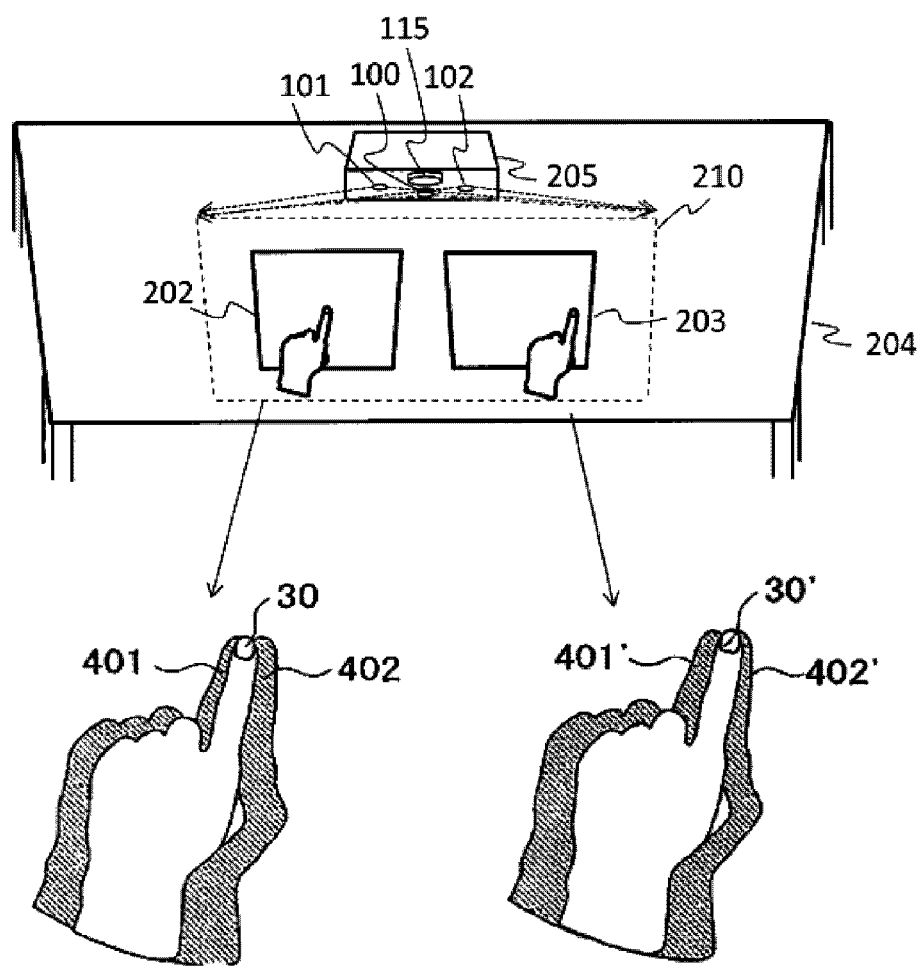
FIG. 5 is a diagram that illustrates the shapes of shadows according to user's operation positions.

FIG. 5 is a diagram that illustrates the influence of user's operation on shapes of shadows. Here, a camera image of a case where the user's operation position deviates to the left side from the center of the projection object 204 (a user position 3) and a camera image of a case where the user's operation position deviates to the right side (user position 3') are compared with each other. At this time, while the user's operation position viewed from the camera 100 changes, in such camera images, the positional relations of shadows 401 (401') and 402 (402') with respect to the finger 30 (30') are not changed. In other words, regardless of the user's operation position, the shadows 401 (401') and 402 (402)' are constantly present on both sides of the finger 30 (30'). The reason for this is that the positional relations are uniquely determined based on the positional relations between the camera 100 and the illuminations 101 and 102. Accordingly, even in a case where the user performs an operation at any position with respect to the projection object 204, two shadows 401 and 402 can be detected, and the operation detecting method according to this embodiment can be effectively applied.

Figure 6:
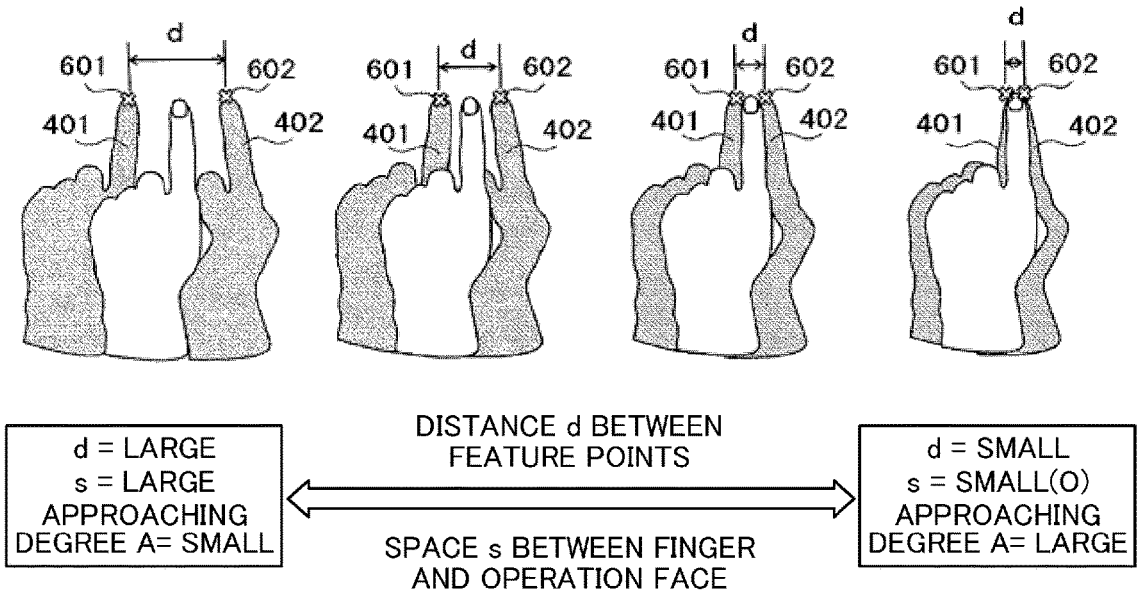
FIG. 6 is a diagram that illustrates a relation between a space between a finger and an operation surface and the shape of a shadow.

FIG. 6 is a diagram that illustrates a relation between a space between a finger and an operation surface and the shape of a shadow. A gap between two shadows 401 and 402 formed on both sides of the finger 30 changes according to a space s between the finger 30 and the projection object 204. In order to define the gap between the two shadows 401 and 402, feature points 601 and 602 (denoted by x marks) are respectively set on the inside of the shadows 401 and 402, and a distance d between the feature points is measured. Here, the feature points are set at the tip end positions (fingertip positions) of the shadows. In a case where the space s between the finger 30 and the projection object 204 is large, the gap between the two shadows 401 and 402 is large, and the distance d between the two feature points 601 and 602 is large as well. As the finger 30 approaches the projection object 204, the distance d between the feature points 601 and 602 is decreased, and, when the finger 30 is brought into contact with the projection object 204 (space s=0), the distance d between the feature points 601 and 602 is a minimal value.

Figure 7:
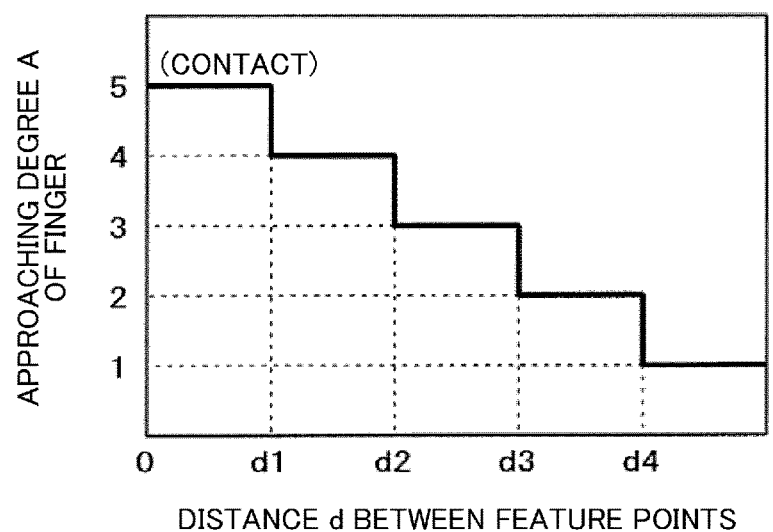
FIG. 7 is a diagram that illustrates a determination of an approaching degree using feature points.

FIG. 7 is a diagram that illustrates a determination of an approaching degree performed by the approaching degree detecting unit 106. Here, a determination of the approaching degree A of the finger is performed based on a distance d between feature points. In order to determine the approaching degree A of the finger, four thresholds d1, d2, d3, and d4 (here, $d1<d2<d3<d4$) are set for the distance d between feature points. In this way, the approaching degree A is classified into five levels (levels 1 to 5), and, the larger the level value is, the smaller the space s between the finger 30 and the projection object 204 is. First, the threshold d1 used for identifying a state (space s=0) in which the finger 30 is brought into contact with the projection object 204 is set, and, in a case where the distance d<d1, the approaching degree A is determined to be a maximum level 5 (contact state). Then, for the other non-contact states, the approaching degree A is classified into four levels (levels 4 to 1) by using the thresholds d2 to d4. Among these, in a case where d>d4, the approaching degree A is determined to be a minimum level 1. In this example, while the approaching degree is classified into the five levels by using the four thresholds, the classified number of the approaching degrees is not limited thereto but may be appropriately set according to a control content.

Figure 8:
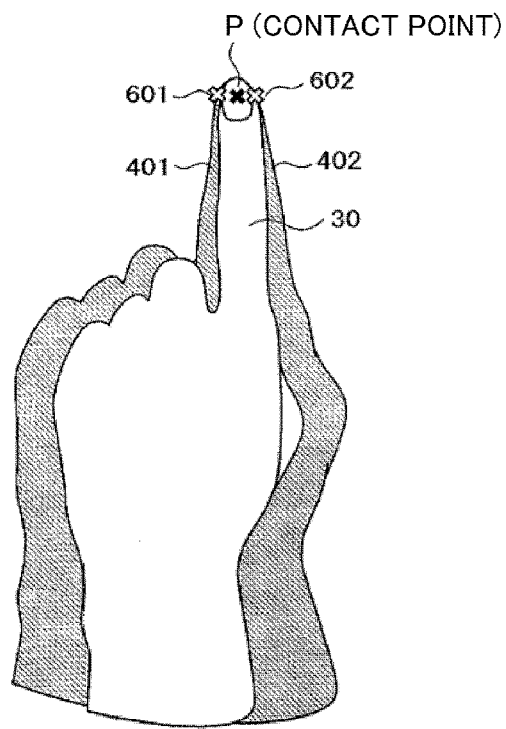
FIG. 8 is a diagram that illustrates a determination of a contact point using feature points.

FIG. 8 is a diagram that illustrates a determination of a contact point performed by the contact point detecting unit 107. The shapes of the shadows 401 and 402 in the state in which the finger 30 is brought into contact with the projection object 204 are illustrated, and, here, feature points 601 and 602 are respectively set as tip end positions of shadows 401 and 402. In this case, since the two feature points 601 and 602 are close to the position of a fingertip that is a contact point, a middle point P between the two feature points 601 and 602 is regarded as a contact point between the finger 30 and the projection object 204, and the coordinates thereof can be calculated.

In the example described above, while the feature points 601 and 602 are respectively set to the tip end positions of the shadows 401 and 402, according to this method, feature points can be easily set, and the position of the contact point P is present neighboring thereto and thus, can be easily determined.

Figure 9:
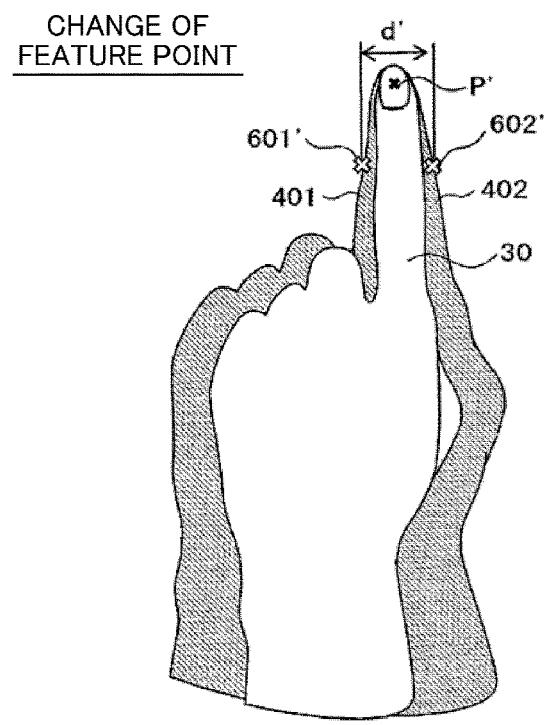
FIG. 9 is a diagram that illustrates a case where feature points are set to different positions.

FIG. 9 is a diagram that illustrates a case where feature points are set to different positions. While the feature points 601 and 602 are set to the tip end positions of the shadows 401 and 402 in the case illustrated in FIG. 8, feature points 601' and 602' are set to middle positions of shadows in the longitudinal directions in the case illustrated in FIG. 9. Also in this case, a distance d' between the feature points 601' and 602' changes in accompaniment with a change in the gap between the shadows 401 and 402, and accordingly, a determination of the approaching degree A between the finger 30 and the projection object 204 can be performed. Since the contact point P' of this case deviates from the positions of the feature points 601' and 602' in the longitudinal direction, a distance (correction amount) to the contact point P' that is predicted based on the feature points 601' and 602' is acquired in advance, and a correction is performed using the distance, whereby the contact point P' can be acquired. Similarly, feature points may be set to positions other than positions disposed inside the shadows 401 and 402.

Figure 10:
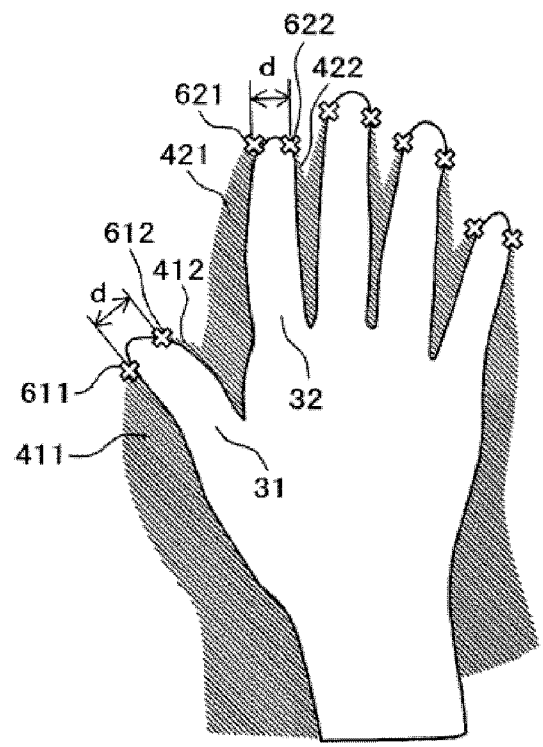
FIG. 10 is a diagram that illustrates the shapes of shadows of a case where an operation is performed using a plurality of fingers.

FIG. 10 is a diagram that illustrates the shapes of shadows of a case where an operation is performed using a plurality of fingers. When a plurality of fingers 31, 32, . . . are brought into contact with the operation surface in a hand-open state, left shadows 411, 421, . . . and right shadows 412, 422, . . . are formed for the fingers. Then, a feature point is set for each of the shadows. Here, feature points 611 and 612 for the shadows 411 and 412 and feature points 621 and 622 for the shadows 421 and 422 are illustrated. By measuring a distance d between the corresponding feature points 611 and 612 or the corresponding feature points 621 and 622, an approaching degree or a contact point of each of the fingers 31 and 32 can be acquired. In this way, according to this embodiment, contacts for the plurality of fingers can be independently detected also in the hand-open state, and accordingly, the embodiment can be applied to a multi-touch operation.

Figure 11A:
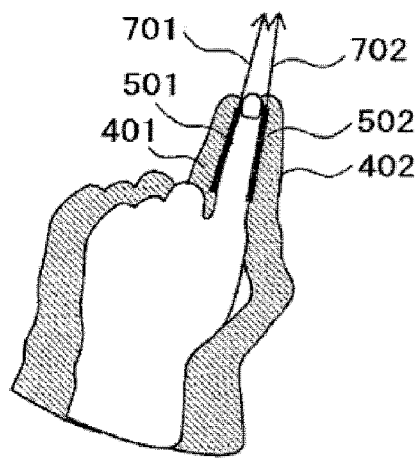
FIG. 11A is a diagram that illustrates a determination of a pointing direction using a contour line.
Figure 11B:
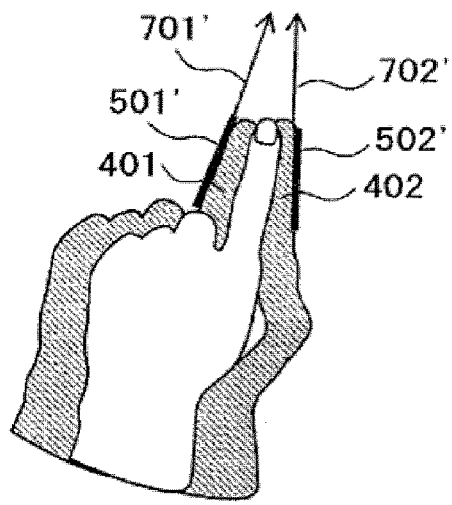
FIG. 11B is a diagram that illustrates a determination of a pointing direction using a contour line.
Figure 11C:
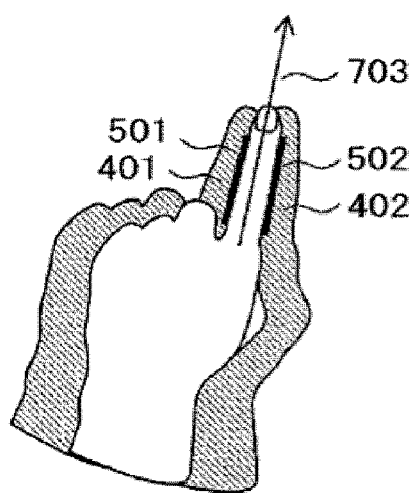
FIG. 11C is a diagram that illustrates a determination of a pointing direction using a contour line.

FIGS. 11A to 11C are diagrams that illustrate determinations of pointing directions that are performed by the direction detecting unit 109. In the drawings, the shapes of the shadows 401 and 402 when the direction (pointing direction) of the finger 30 is inclined are illustrated, and the directions of the shadows 401 and 402 are changed in accompaniment with a change in the pointing direction. In order to detect the pointing direction, first, the contour detecting unit 108 detects contour lines 501 and 502 of the shadows 401 and 402. In the detection of each contour line, a curved portion such as a fingertip is eliminated, and a contour line formed by segments each having an approximately linear shape is detected. Thereafter, the direction detecting unit 109 determines a pointing direction using the following method.

In the case illustrated in FIG. 11A, inner contour lines 501 and 502 of the shadows 401 and 402 are used. Then, one of the inclining directions 701 and 702 of the inner contour lines 501 and 502 is determined as the pointing direction.

In the case illustrated in FIG. 11B, outer contour lines 501' and 502' of the shadows 401 and 402 are used. Then, one of the inclining directions 701' and 702' of the outer contour lines 501' and 502' is determined as the pointing direction.

In the case illustrated in FIG. 11C, the inner contour lines 501 and 502 of the shadows 401 and 402 are used. Then, the inclining direction 703 of a median line of the inner contour lines 501 and 502 is determined as a pointing direction. In this case, since the pointing direction is acquired based on an average of the directions of the two contour lines 501 and 502, the accuracy is improved. Here, the direction of a median line of the outer contour lines 501' and 502' may be determined as the pointing direction.

Figure 12A:
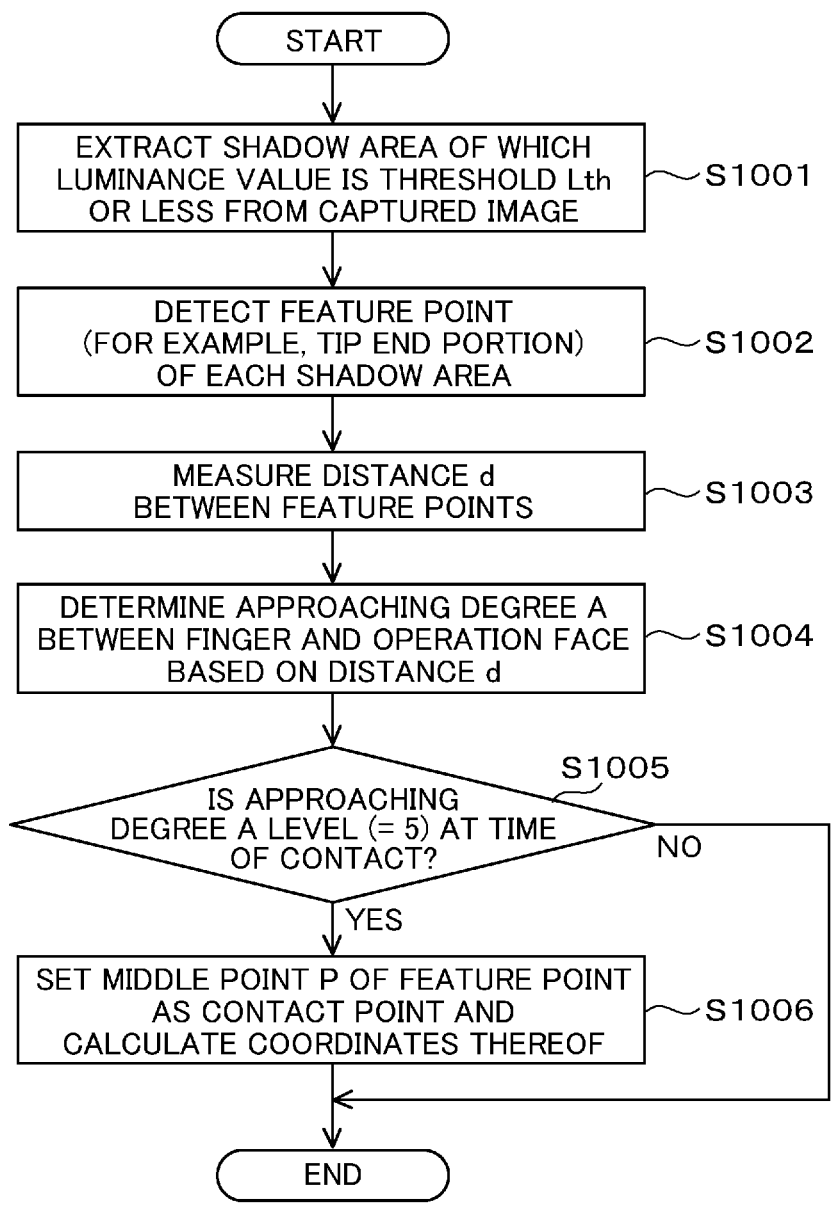
FIG. 12A is a diagram that illustrates a process flow of an operation detecting method.

FIGS. 12A and 12B are diagrams that illustrate process flows of an operation detecting method according to Embodiment 1. FIG. 12A is a flowchart that illustrates the detection of an approaching degree and a contact point, and FIG. 12B is a flowchart that illustrates the detection of a pointing direction.

First, the method of detecting an approaching degree and a contact point illustrated in FIG. 11A will be described.

In S1001, the shadow area extracting unit 104 acquires a differential image by subtracting a background from an image captured by the camera 100 and extracts a portion of which the luminance is the threshold Lth or less as a shadow area. At that time, a so-called labeling process in which shadow areas not connected to each other among extracted shadows are identified as different shadows is performed.

In S1002, the feature point detecting unit 105 detects a feature point for each labeling-processed shadow. For example, as illustrated in FIG. 6, the tip end positions of the shadows 401 and 402 are detected as feature points 601 and 602.

In S1003, a distance d between the two feature points 601 and 602 that have been detected is measured.

In S1004, the approaching degree detecting unit 106 determines an approaching degree A between the finger 30 and the projection object 204 based on the distance d. In the determination, for example, the distance d is compared with the thresholds d1 to d4 with reference to FIG. 7 and classifies the approaching degree A into the levels 1 to 5. Then, in a case where d<d1, it is determined that the approaching degree A=5 (contact state).

In S1005, it is determined whether or not the determined approaching degree A is the level (=5) at the time of a contact. In a case where a result of the determination is the approaching degree A=5, the process proceeds to S1006. On the other hand, in case of another determination result (non-contact state), the process ends.

In S1006, the contact point detecting unit 107 detects a contact point between the finger 30 and the projection object 204. For example, as illustrated in FIG. 8, a middle point P of two feature points 601 and 602 is determined as a contact point, and the coordinates thereof are calculated. In a case where the method of setting feature points is different from that described above (tip end position), the position of the contact point may be corrected according to the setting method.

In an operated state, the process flow described above is repeatedly executed, and operation detection following a change in the operation state is performed.

Next, a method of detecting the pointing direction illustrated in FIG. 12B will be described.

In S1011, the shadow area extracting unit 104 acquires a differential image by subtracting a background from an image captured by the camera 100 and extracts a portion of which the luminance is the threshold Lth or less as a shadow area. This is similar to S1001 described above.

In S1012, the contour detecting unit 108 detects a contour line (an approximately linear portion) for each labeling-processed shadow. For example, as illustrated in FIG. 11C, the inner contour lines 501 and 502 of the shadows 401 and 402 are detected. At that time, a curved portion such as a fingertip is eliminated from such a contour line, whereby segments each having an approximately linear shape are detected.

In S1013, the direction detecting unit 109 determines the inclining direction 703 of a median line of the contour lines 501 and 502 as the pointing direction. For the determination of the pointing direction, a method illustrated in FIG. 11A or FIG. 11B may be used.

In an operated state, the process flow described above is repeatedly executed, and operation detection following a change in the operation state is performed.

In addition, the process of detecting an approaching degree and a contact point illustrated in FIG. 12A and the pointing direction detecting process illustrated in FIG. 12B may be performed in parallel.

FIG. 13 is a diagram that illustrates an example of control according to the approaching degree of a finger performed by the display control unit 121.

In the diagram, switching among operation modes and pointer display switching according to an approaching degree A between the finger 30 and the projection object 204 are illustrated.

At the level 5 (contact state), which is the highest level, of the approaching degree A, the operation mode is set to a contact operation mode. At the levels 4 and 3, which are relatively high, of the approaching degree A in the other non-contact states, the operation mode is switched to an air operation mode. In addition, at the levels 2 and 1, which are relatively low, of the approaching degree A, the operation mode is switched to an operation-off mode. According to such control, also in a state in which the finger is floating from the projection object 204 in addition to the state in which the finger 30 is brought into contact with the projection object 204, the user 3 can operate an operation target device. In addition, in a case where the finger 30 is separate from the projection object 204 by a predetermined distance or more, the operation mode is switched to the operation-off mode, and an unintended user's operation can be prevented.

In addition, regarding the pointer display, at the levels 5 and 4, which are relatively high, of the approaching degree A, the pointer is displayed, and, at the levels 3, 2, and 1, which are relatively low, of the approaching degree A, the pointer is switched not to be displayed. According to such control, the user 3 can check the pointer in a stage before the finger 30 being brought into contact with the projection object 204, and the position of the pointer at the time of a contact can be easily matched. According to the control described above, the operability of the operation target device is improved.

Figure 14A:
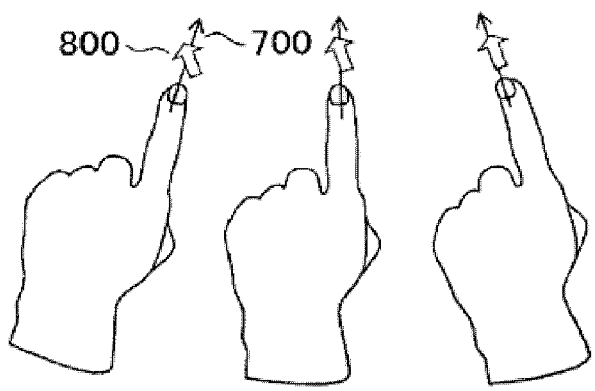
FIG. 14A is a diagram that illustrates an example of control according to a pointing direction.
Figure 14B:
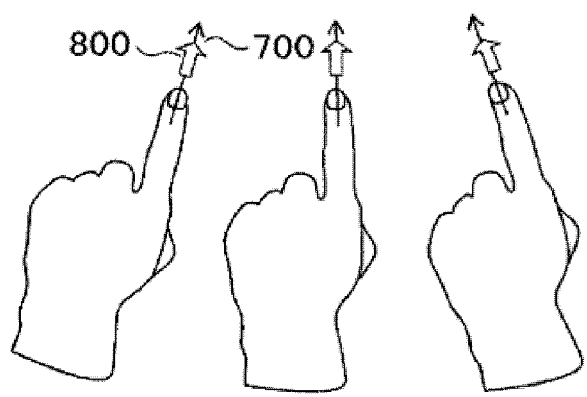
FIG. 14B is a diagram that illustrates an example of control according to a pointing direction.
Figure 14C:
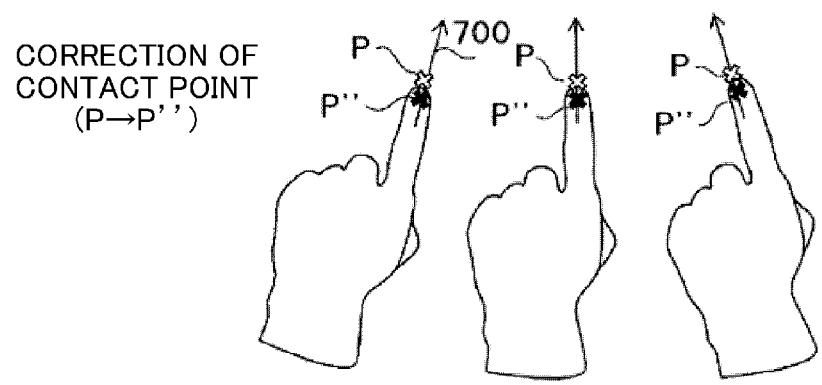
FIG. 14C is a diagram that illustrates an example of control according to a pointing direction.

FIGS. 14A to 14C are diagrams that illustrate an example of control according to a pointing direction performed by the display control unit 121.

FIG. 14A illustrates a case where the display position of the pointer 800 is corrected according to the pointing direction 700. When a pointer 800 is displayed, in a case where the pointer is displayed at a position that is exactly the same as that of a contact point P detected by the contact point detecting unit 107, the pointer 800 is hidden by the finger 30 and, it is difficult for the pointer to be seen from the user 3. Thus, along the pointing direction 700 detected by the direction detecting unit 109, the pointer 800 is displayed to be shifted to the front side of the fingertip by a predetermined amount. Accordingly, the pointer 800 can be easily seen from the user 3.

In addition to the description presented above, the shift amount (correction amount) of the display position of the pointer 800 may be changed according to the approaching degree A of the finger 30. For example, when the approaching degree A is low, the correction amount is increased, and, when the approaching degree A is high, the correction amount is decreased. Accordingly, as the finger 30 of the user 3 approaches the projection object 204, the position of the pointer 800 becomes closer to the fingertip, and the user 3 can perform an operation having high accuracy by using the display position of the pointer 800 as the reference.

FIG. 14B illustrates a case where the display direction of the pointer 800 is corrected according to the pointing direction 700. When a pointer 800 having an arrow shape is displayed, for example, as illustrated in FIG. 14A, in a case where the pointer is constantly displayed in a constant direction regardless of the pointing direction 700, there are cases where the display direction of the pointer 800 does not match the pointing direction 700, and the user 3 is caused to feel discomfort. Thus, the direction detecting unit 109 performs display such that the display direction of the pointer 800 matches the pointing direction 700 detected by the direction detecting unit 109. In this way, there is no mismatching with the pointing direction 700, and the discomfort of the user 3 can be resolved.

FIG. 14C illustrates a case where the position of the contact point is corrected according to the pointing direction 700. The contact point P detected by the contact point detecting unit 107 is determined based on the position of a feature point, and accordingly, there are cases where the contact point deviates from a position that is actually in contact with the projection object 204. For example, in a case where the feature point is set to the tip end position of the shadow, the contact point deviates from an actual contact position (in many cases, a finger cushion portion) to a position of the tip end side (nail tip) of the finger. Thus, along the pointing direction 700 detected by the direction detecting unit 109, the position of the contact point is corrected to the root side of the finger by a predetermined amount (P→P"). Accordingly, the contact point between the finger 30 and the projection object 204 can be more accurately acquired.

The method of detecting the operation content of the user 3 through pointing detection or the like in the projection-type display device 205 provided with the operation detecting function has been described as above. In the detection system for a contact point and a pointing direction through a pointing gesture according to the system described above, an operation can be performed in a case where a thin object such as a finger is present. Compared to a light emitting pen type in which a recognition process is performed by emitting predetermined light from a pen tip, in this system, a dedicated light emitting pen, or the like does not need to be secured, and the usability thereof is greatly high.

Subsequently, a screen operation realized by the operation of the user 3 such as the pointing operation described until now will be described.

The number of display screens before the operation, the orientation of the display, the position of the display, the size of the display, and the like are determined using a method presented in the following examples and the like.

For example, a setting of the display screen that is set as default in the projection-type display device 205 provided with the operation detecting function may be used.

In addition, the user may manually determine the number of display screens, the orientation of the display, the size of the display, and the like by setting conditions.

Furthermore, through the pointing detection or the like described above, for example, by specifying the position at which a person is present by estimating the stretching direction of a finger or an arm or specifying the number of users based on the number of fingers or hands that are stretched forward, the display direction that can be easily recognized or the number of display screens may be set.

In addition, the number and the positions of users, the shape of a projection object, and the like are recognized, and the number of display screens, the display position, the orientation of the display, the size of the display, and the like may be determined in accordance therewith. In the recognition of the number and the positions of users, the shape of the projection object, and the like, the projection-type display device installed on a desk has advantages in that a distance to a recognition object is short, and the frequency at which the recognition object is blocked by an obstacle is low.

Figure 15:
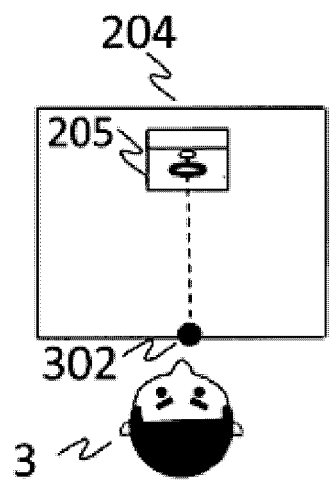
FIG. 15 is a diagram that illustrates that a user is present near a rectangular desk.
Figure 16:
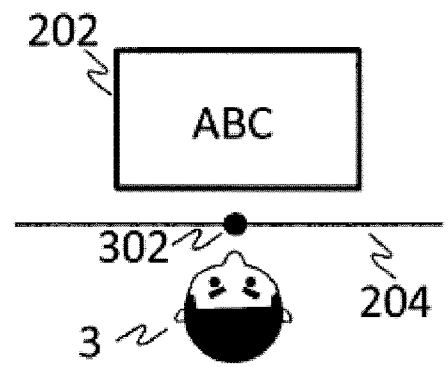
FIG. 16 is a diagram that illustrates a display direction determined based on a user's position and the shape of the edge of the rectangular desk.

FIGS. 15 to 18 illustrate examples of methods for determining the display direction of a display screen by recognizing the shape of a projection object and the like. FIGS. 15 and 16 are examples of a case where projection is performed for a rectangular desk. As illustrated in FIG. 15, it is photographed and recognized by the camera 100 of the projection-type display device 205 provided with the operation detecting function that a user 3 is present near the projection object 204 that is the rectangular desk. In addition, the position of the edge of the desk of a most approaching portion 302 between the user 3 and the edge of the desk is recognized. The display direction is determined to be a direction in which the direction of the edge of the position of the most approaching portion 302 and the bottom side of a display video are parallel to each other, and the position of the most approaching portion 302 is on the lower side, in other words, a direction in which a display video 202 illustrated in FIG. 16 is displayed.

Figure 17:
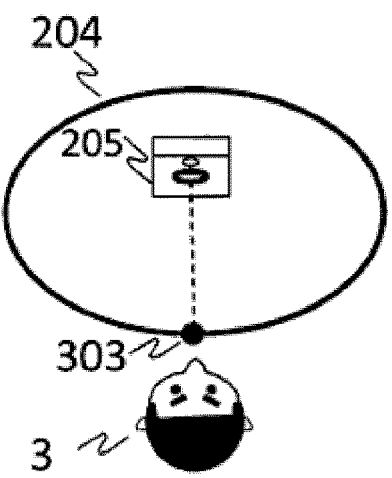
FIG. 17 is a diagram illustrating that a user is present near a circular desk.
Figure 18:
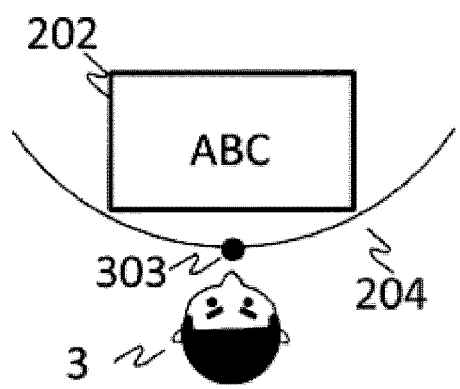
FIG. 18 is a diagram that illustrates a display direction determined based on user's position and the shape of the edge of the circular desk.

FIGS. 17 and 18 are examples of a case where projection is performed for a circular desk. As illustrated in FIG. 17, it is photographed and recognized by the camera 100 of the projection-type display device 205 provided with the operation detecting function that a user 3 is present near the projection object 204 that is the rectangular desk. In addition, the position of the edge of the desk of a most approaching portion 303 between the user 3 and the edge of the desk is recognized. The display direction is determined to be a direction in which the direction of the edge of the position of the most approaching portion 303 and the bottom side of a display video are parallel to each other, and the position of the most approaching portion 303 is on the lower side, in other words, a direction in which a display video 202 illustrated in FIG. 18 is displayed.

In the description presented with reference to FIGS. 15 to 18, while the position of the user 3 and the shape of a projection object are described to be photographed using the camera 100 as an example, the camera 100 is basically used for photographing an operation of the user 3 through the pointing detection or the like, and accordingly, an additional camera used for photographing the position of the user 3 and the shape of a projection object may be provided.

In a case where a plurality of videos are displayed as illustrated in FIG. 3, and each display direction may be determined by performing a similar operation for the positions of a plurality of persons. FIGS. 19 and 20 illustrate examples of a case where a plurality of display videos are displayed. In any one of the examples, a plurality of persons and the positions thereof are detected, and the display position and the display direction are determined based on the position and the shape of an edge of the desk that is closest from the position.

In this way, a display direction can be automatically determined based on the shape of the edge of the desk that is closest to the user 3.

Figure 24A:
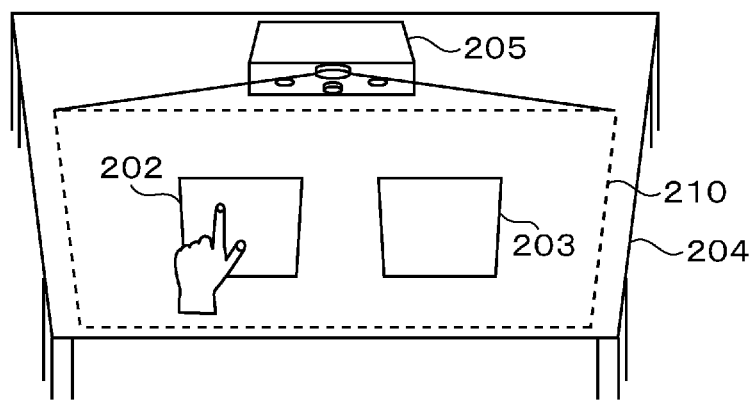
FIG. 24A is a diagram that illustrates an example of an operation of enlarging a display screen using a finger operation.
Figure 24B:
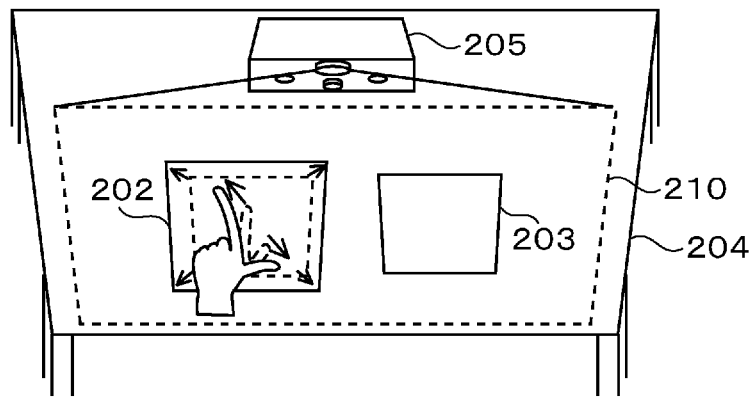
FIG. 24B is a diagram that illustrates an example of an operation of enlarging a display screen using a finger operation.

Examples of a case where a display screen determined using such a method is operated according to a screen operation performed through a gesture of the user 3 are illustrated in FIGS. 21A and 24B. It is assumed that a fingertip illustrated in each diagram is brought into contact with the projection object 204. For example, FIG. 21A illustrate a state before the operation, and 21B illustrates a state after the operation. FIGS. 22A to 24B similarly illustrate such states.

In many of the drawing of FIG. 21A and subsequent drawings, similar to FIG. 1, a maximum range 210 in which the projection-type display device 205 can optically project an image is illustrated using broken lines. As described above, display screens 202 and 203 are displayed within the display range of the maximum projection range 210 like an OSD. In other words, the display screens 202 and 203 are partial images in the maximum projection range 210.

FIGS. 21A and 21B illustrate an example of a parallel movement. A finger that is brought into contact with the display screen 203 illustrated in FIG. 21A is moved in one of a vertical direction, a horizontal direction, and an inkling direction without changing the direction. Then, as illustrated in FIG. 21B, only a display screen, with which the finger is brought into contact, of the display screens is moved in a same manner as the movement of the finger. In this way, one of the display screens can be moved to a position desired by the user.

Figure 22A:
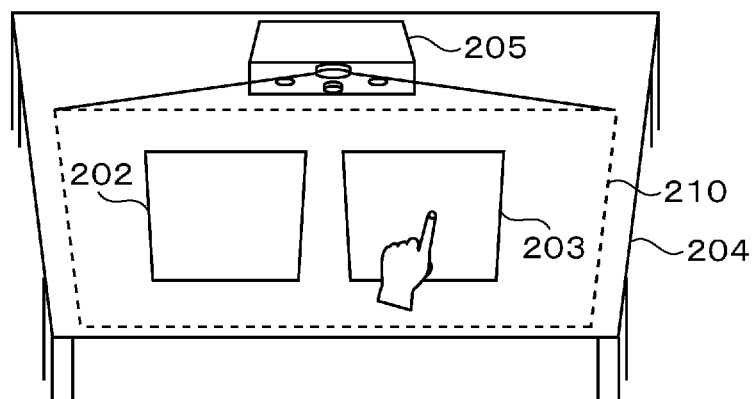
FIG. 22A is a diagram that illustrates an example of rotary movement using a finger operation.
Figure 22B:
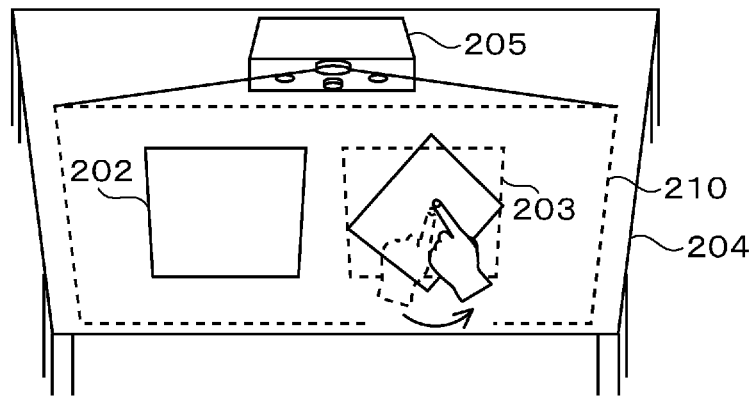
FIG. 22B is a diagram that illustrates an example of rotary movement using a finger operation.

FIGS. 22A and 22B illustrate an example of a rotary movement. A finger that is brought into contact with the display screen 203 illustrated in FIG. 22A is rotated. Then, as illustrated in FIG. 22B, the display direction of only a display screen, with which the finger is brought into contact, of display screens is rotated according to the motion of the finger. In this way, one of the display screens can be rotated in a direction desired by the user.

In the configuration of this embodiment, the pointing direction can be detected. Accordingly, as illustrated in FIG. 22B, also in a case where the direction of a finger is rotated without changing the position of a contact point, a rotation operation of the display screen can be realized. This is the rotation operation that is difficult to be realized in a touch sensor of a tablet terminal or the like and can be realized first by employing the configuration of this embodiment.

When the rotation operation of a display screen is performed, there are cases where the display screen cannot be rotated with the size of the display screen before the rotation maintained according to a relation between a shape within an optical projectable range of the projection-type display device 205 and the position and the shape of the display screen to be rotated. In such cases, a display screen reduction process may be performed in parallel in the middle of the rotation. In a case where the display screen reduction process is necessary when the display screen is rotated in one direction, after the the display screen is rotated halfway and is reduced, when the display screen is rotated in the opposite direction and is returned to the original angle, the display screen may be returned to the original size by performing an enlargement process.

FIGS. 23A and 23B illustrate an example of an operation for increasing the number of display screens. In the state illustrated in FIG. 23A, by moving a finger brought into contact with the outside of the display screen 200 to the outside of the opposite side, a motion like a motion of cutting the display screen into halves is performed. Then, as illustrated in FIG. 23B, since the display screen is cut into halves, like cell division, two screens displaying the same content as that displayed on the display screen 200 are generated (display screens 202 and 203). In this way, the number of display screens as desired by the user can be increased.

FIGS. 24A and 24B illustrate an example of an operation of enlarging a display screen. Two fingers brought into contact with the display screen 202 illustrated in FIG. 24A are positioned at vertexes of a rectangle facing each other, and a distance between the two fingers is increased such that a diagonal line joining the vertexes facing each other is enlarged as illustrated in FIG. 24B. Then, the screen is enlarged corresponding to the expansion of only the operated display screen 202. By operating in the opposite direction, an operation of displaying an area that has run off to the outside of the display screen 202 until now by reducing the screen can be performed. In this way, the display screen can be enlarged or reduced as is desired by the user.

Next, an example of a display screen operation using a plurality of fingers will be described with reference to FIGS. 25A to 28B.

Figure 25A:
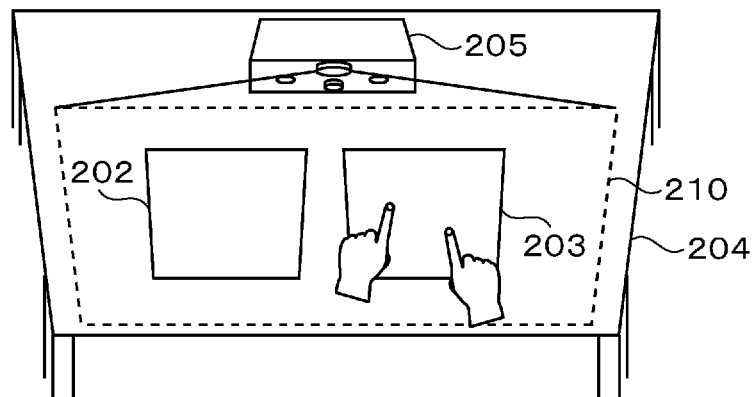
FIG. 25A is a diagram that illustrates an example of an operation of a plurality of fingers.
Figure 25B:
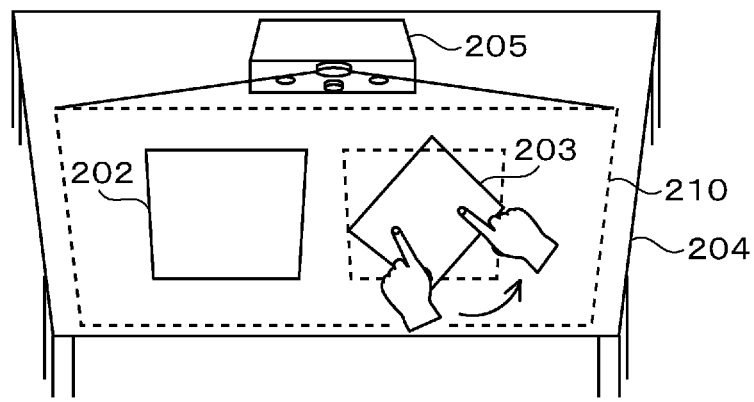
FIG. 25B is a diagram that illustrates an example of an operation of a plurality of fingers.

FIGS. 25A and 25B illustrate an example of rotating a display screen 203 by operating two fingers. As illustrated in FIG. 25A, in a case where both two fingers are brought into contact with a desk within the display screen 203, when it is detected that the two fingers move such that a slope of a straight line joining contact points of the two fingers changes as illustrated in FIG. 25B, the projection-type display device 205 provided with the operation detecting function changes the display angle of the display screen 203 so as to respond to the change in the slope. In this way, the rotation process of the display screen can be performed.

Figure 26A:
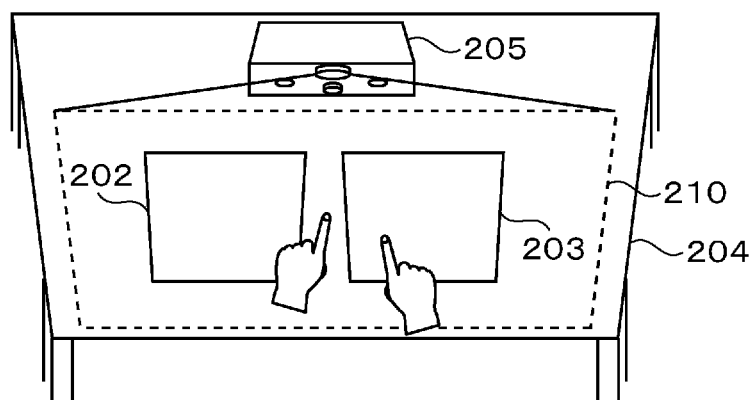
FIG. 26A is a diagram that illustrates an example of an operation of a plurality of fingers.
Figure 26B:
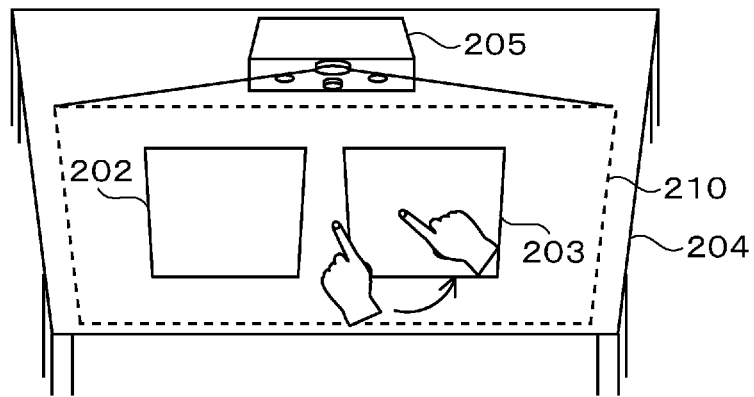
FIG. 26B is a diagram that illustrates an example of an operation of a plurality of fingers.

In contrast to this, as illustrated in FIG. 26A, even in a case where both two fingers are brought into contact with the desk, in a case where both two contact points of the two fingers are not present inside one display screen (for example, a case where only the contact point of one finger is present within the display screen 203, and the contact point of the other finger is present outside the display screen 203 or the like), as illustrated in FIG. 26B, even when the two fingers move such that a slope of a straight line joining the contact points of the two fingers is changed, the display angle of the display screen 203 may not be changed.

Among a plurality of fingers detected by the camera 100, two fingers of which desk contact times have a difference less than a predetermined time may be determined by the control unit 110 as a combination of fingers to be targets for the process described with reference to FIGS. 25A to 26B. For example, among a plurality of fingers detected by the camera 100, two fingers of which desk contact times have a difference less than one second are detected by the control unit 110, and the combination of the two fingers may be determined as a combination of fingers that are targets for the process described with reference to FIGS. 25A to 26B.

As the contact positions of the two fingers described above and the contact positions of the two fingers used in the process of determining the range of the display screen 203, first positions at which the two fingers are brought into contact with the desk from the air may be used. In a case where such fingers move from the outside of the display screen 203 to the inside thereof while being brought into contact with the desk or the like, the rotation process of the display screen may not be started. In this way, by determining whether or not the rotation process is started based only on first positions at which the two fingers are brought into contact with the desk from the air, the process can be simplified, and there is an effect of improving the process efficiency of the control unit 110. In addition, according to the determination process described above, among a plurality of display screens, a display screen that is a target for the rotation process operation can be clearly specified.

Figure 27A:
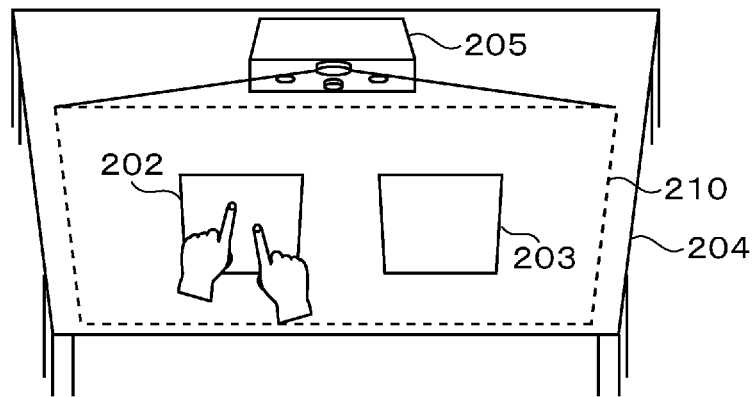
FIG. 27A is a diagram that illustrates an example of an operation of a plurality of fingers.
Figure 27B:
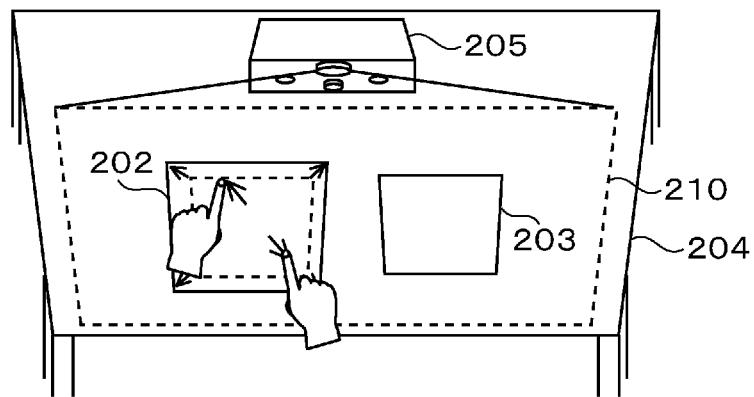
FIG. 27B is a diagram that illustrates an example of an operation of a plurality of fingers.

Next, FIGS. 27A and 27B illustrate an example in which a display screen 202 is enlarged by operating two fingers. As illustrated in FIG. 27A, in a case where both two fingers are brought into contact with a desk inside the display screen 202, when it is detected that the two fingers move such that a distance of a straight line joining contact points of the two fingers is increased as illustrated in FIG. 27B, the projection-type display device 205 provided with the operation detecting function changes the display size of the display screen 202 so as to respond to the change in the length. In this way, the enlargement process of the display screen can be performed. On the other hand, in a case where the distance of the straight line joining the contact points of two fingers is decreased, a reduction process of the display screen is performed.

Figure 28A:
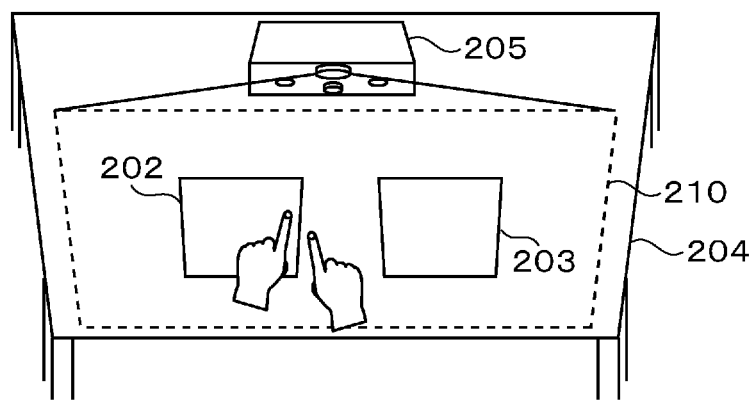
FIG. 28A is a diagram that illustrates an example of an operation of a plurality of fingers.
Figure 28B:
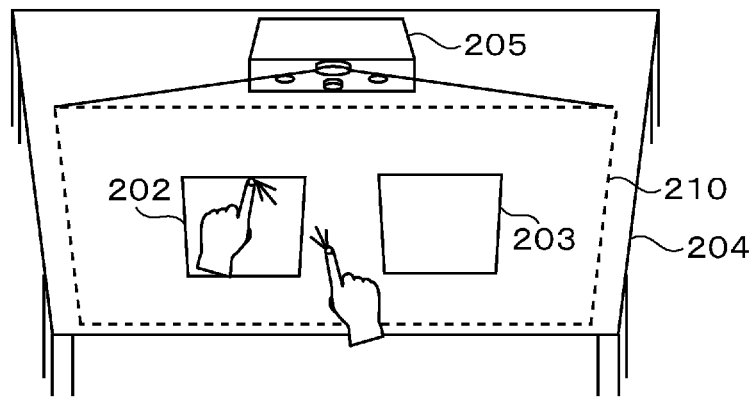
FIG. 28B is a diagram that illustrates an example of an operation of a plurality of fingers.

In contrast to this, as illustrated in FIG. 28A, even in a case where both two fingers are brought into contact with the desk, in a case where one of the contact points of the two fingers is not present within one display screen (for example, in a case where only the contact point of one finger is present within the display screen 202, and the contact point of the other finger is present outside the display screen 202 or the like), as illustrated in FIG. 28B, even when the two fingers move such that the length of the straight line joining the contact points of the two fingers is changed, the size of the display screen 202 may not be changed.

Similar to the examples illustrated in FIGS. 25A to 26B, among a plurality of fingers detected by the camera 100, two fingers of which desk contact times have a difference less than a predetermined time may be determined by the control unit 110 as a combination of fingers to be targets for the process described with reference to FIGS. 27A to 28B. For example, among a plurality of fingers detected by the camera 100, two fingers of which desk contact times have a difference less than one second are detected by the control unit 110, and the combination of the two fingers may be determined as a combination of two fingers that are targets for the process described with reference to FIGS. 27A to 28B.

As the contact positions of the two fingers described above and the contact positions of the two fingers used in the process of determining the range of the display screen 202, first positions at which the two fingers are brought into contact with the desk from the air may be used. In a case where such fingers move from the outside of the display screen 202 to the inside thereof while being brought into contact with the desk or the like, the size changing process of the display screen may not be started. In this way, by determining whether or not the size changing process is started based only on first positions at which the two fingers are brought into contact with the desk from the air, the process can be simplified, and there is an effect of improving the process efficiency of the control unit 110. In addition, according to the determination process described above, among a plurality of display screens, a display screen that is a target for the size changing process operation can be clearly specified.

According to the display screen operation using a plurality of fingers described with reference to FIGS. 25A to 28B as above, a display screen that is a target for the rotation process or the size changing process can be clearly specified. In addition, the process of the control unit can be efficiently performed.

As described above, according to the projection-type display device provided with the operation detecting function that can be installed on a desk, an operation according to pointing detection and the like can be performed with high accuracy.

Second Embodiment

Next, Embodiment 2 of the present invention will be described.

The projection-type display device provided with the operation detecting function illustrated in FIG. 2 includes the illuminations 101 and 102, and the method for detecting shadows of illumination light emitted from two different directions has been described in Embodiment 1. In a case where visible light is used as the illumination light, shadows generated by a pointing operation are reflected on the display screen, and there is a possibility that the visibility of the display screen is degraded. Thus, it is preferable that illuminations of non-visible light such as infrared light as the illumination light are used, and a corresponding camera such as an infrared camera is used as the camera 100.

As points to be noted in a case where non-visible light such as infrared light is used as above, the non-visible light is not visible to the eyes, and thus, in a case where the illumination light is blocked by placing an obstacle or the like before the illuminations 101 and 102, there are problems in that pointing detection or the like is not performed, and the user does not notice the blockage.

In order to avoid such problems, by including a function for warning the user in a case where a situation such as a blockage of the pointing detection is detected by the camera 100, such problems can be solved.

Figure 29:
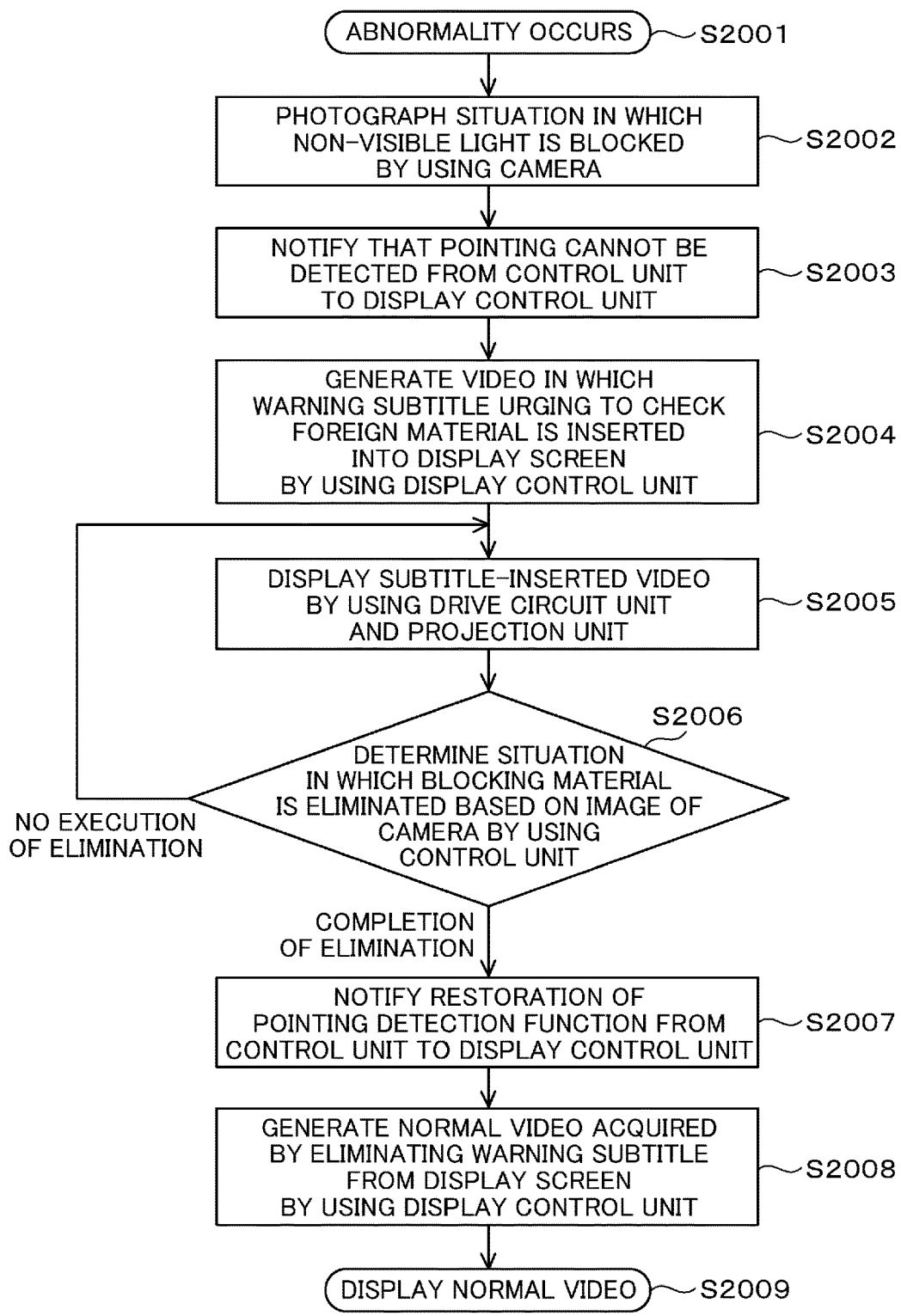
FIG. 29 is a flowchart that illustrates an example of an operation when visible external light is abnormally blocked.

FIG. 29 illustrates a flowchart of a case where such a function is operated.

In S2001, it is assumed that the situation described above occurs. In S2002, the situation is photographed using the camera 100. In S2003, the control unit 110 determines that pointing detection cannot be performed based on an image captured by the camera and notifies the display control unit 111 of the determination.

As criteria for the detection, for example, there are long-time reflection of an object other than a detection object such as a finger set in advance, the blockage of non-visible light over a wide range, reflection of an immovable object for a long time, and the like.

In S2004, the display control unit 111 generates a video acquiring by inserting a warning subtitle such as "Pointing detection is abnormal. Please check that there is no foreign material between a camera and a lighting unit and a display screen." into a display screen and displays the generated video in S2005. Until the camera 100 photographs a situation in which an obstacle of the non-visible light is removed, this display is continued.

In S2006, the control unit 110 determines whether or not the obstacle of the non-visible light is removed based on an image captured by the camera 100. When the obstacle of the light is removed, in S2007, the control unit 110 notifies the display control unit 111 that the pointing detection function has been restored.

In S2008, the display control unit 111 generates a normal display screen in which the warning subtitle is eliminated and returns the display screen to the normal display screen in S2009. As above, an example of a series of operations has been described.

In the description presented until now, while the method of notifying the user of an abnormality such as blockage of non-visible light disturbing the pointing detection or the like by inserting a warning subtitle into the display screen has been described, a warning using another means such as a warning using a sound, lighting of a warning lamp arranged in advance, or the like may be used.

As described above, by including the function for detecting the situation in which the pointing detection or the like is disturbed and the function for warning the user, it can be prevented that functions of the pointing detection and the like are interrupted while the user does not notice the interrupt.

Third Embodiment

Next, Embodiment 3 of the present invention will be described.

In the projection-type display device described in Embodiment 1 of the present invention, as described above, various screen operations can be performed through viewer's gesture operations (pointing operations). However, some of operations that can be input to the projection-type display device according to this embodiment are operations that cannot be performed in a finger touch detecting-type tablet and the like, and there are also cases where a user is inexperienced. Thus, in a projection-type display device according to Embodiment 3 of the present invention, in addition to the configuration and the functions of the projection-type display device according to Embodiment 1 or Embodiment 2, an operation guide display function is mounted.

Figure 30:
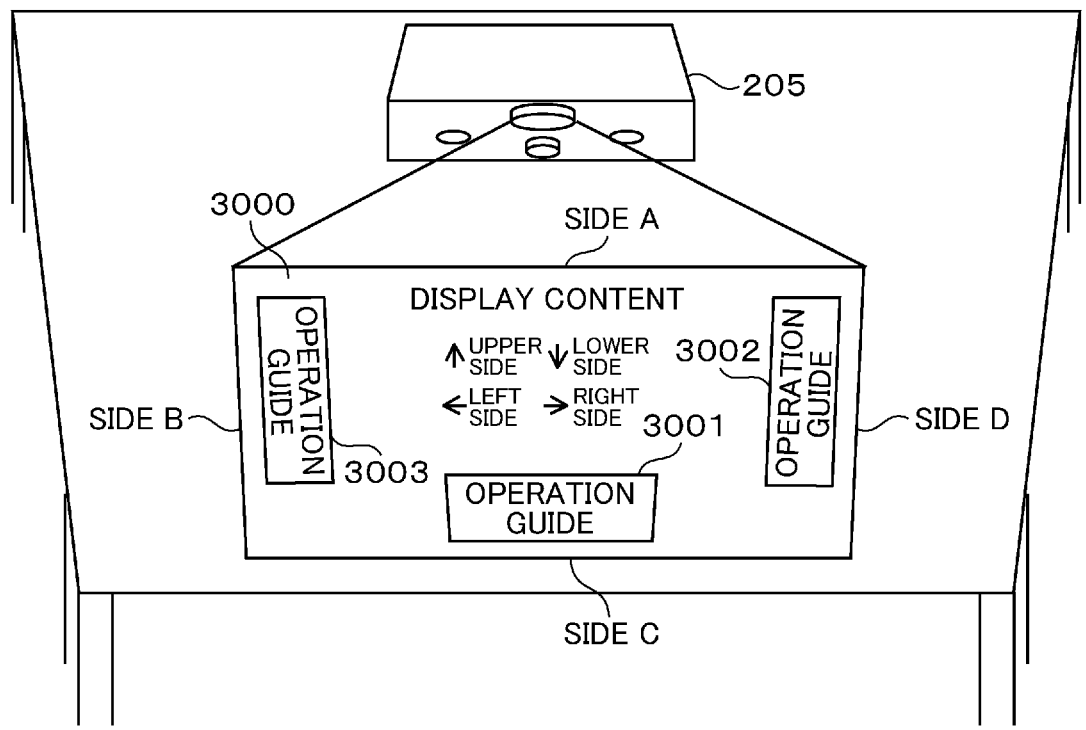
FIG. 30 is a diagram that illustrates an example of an operation guide display.

FIG. 30 is a diagram that illustrates an example of an operation guide display according to this embodiment. In the example illustrated in FIG. 30, the projection-type display device 205 displays one display content on a display screen 3000 projected onto a desk. In the display content, upward, downward, leftward, and rightward directions are as illustrated in the drawing. As an example of the guide display of the projection-type display device 205, as illustrated in FIG. 30, a plurality of operation guide displays 3001, 3002, and 3003 are displayed at mutually-different angles for the display content. The example of the operation guide display is a so-called on-screen display (OSD) and is displayed by a display control unit 111 to be superimposed on an input signal based on data stored in a storage unit, which is not illustrated in the drawing, arranged inside the projection-type display device 205 under the control of the control unit 110.

In FIG. 30, not only the operation guide display 3001 displayed in the same directions as the upward, downward, leftward, and rightward directions of the display content, the operation guide displays 3002 and 3003 displayed in different directions are displayed. Accordingly, among users standing on the periphery of the desk, an operation method can be conveyed not only to a viewer viewing the display content on the front side but also to viewers viewing the display content at angles other than the angle of the front side.

Particularly, as illustrated in FIG. 30, in a situation in which the projection-type display device 205 is installed to one side A among sides A to D of the rectangular display screen 3000, there is a low possibility that a viewer who can perform a gesture operation is present on the side A. Here, in a case where viewers are present on three sides B, C, and D other than the side A on which the projection-type display device 205 is installed, and the display content is displayed in a direction in which the display content can be easily viewed from a position of one side (for example, the side C)

among them, when only the operation guide display 3001 displayed in the same directions as the upward, downward, leftward, and rightward directions of the display content is displayed, the viewers present on the other two sides (for example, the sides B and D) do not know the operation method and are compelled to take the trouble to move up to the position of the side C.

In contrast to this, in the projection-type display device 205 according to this embodiment, a plurality of operation guide displays can be displayed at mutually-different angles. As illustrated in FIG. 30, the directions of the three sides B, C, and D may be displayed in correspondence with the leftward/rightward directions of the plurality of operation guide displays 3001, 3002, and 3003. By displaying as such, for example, all the viewers present on three sides B, C, and D side other than one side A on which the projection-type display device 205 is installed can easily understand the operation method.

Here, the operation guide display may be a diagram illustrating an operation gesture, a diagram illustrating an operation gesture, and a descriptive text thereof, a text describing an operation gesture, or an animation illustrating an operation gesture. In addition, the operation guide display may be a combination thereof.

In addition, timing at which the operation guide display is displayed may be timing at which an operation input of a remote controller button not illustrated in the drawing is performed. Alternatively, it may be configured such that a small question mark is displayed on one corner of the display screen, and the operation guide display as illustrated in FIG. 30 is performed at timing at which viewer' finger touch or gesture operation for the question mark is detected.

According to the operation guide display of this embodiment described above, an operation guide display having improved usability for viewers can be performed.

Fourth Embodiment

Next, Embodiment 4 of the present invention will be described.

In the projection-type display device described in Embodiment 1 of the present invention, as described above, various screen operations can be performed through user's gesture operations (pointing operations). In this embodiment, an example will be described in which, in addition to the configurations and the functions of the projection-type display devices according to Embodiments 1, 2, and 3, a function for displaying detailed information of a display video and a menu screen is mounted.

FIGS. 31A to 31D illustrate operations at the time of displaying detailed information of a display video and a menu screen in a case where a projection-type display device 205 displays one display screen 200 on a desk 204.

Figure 31A:
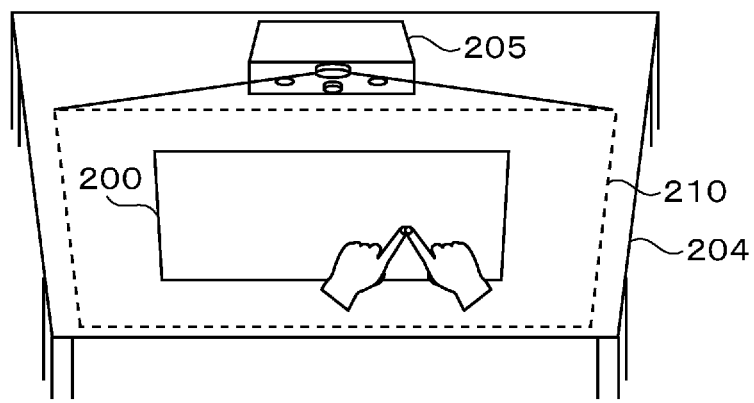
FIG. 31A is a diagram that illustrates an example of an operation of a menu or a detailed information display.

As an example of a gesture recognized when detailed information of a display video and a menu screen are displayed, a gesture in a state in which two fingers having different pointing directions are brought into contact with each other as illustrated in FIG. 31A may be used. Here, two contact points do not need to be completely brought into contact with each other but may satisfy a condition of having a predetermined distance set in the design or less. In addition, as another example of a gesture recognized when detailed information of a display video and a menu screen are displayed, a gesture in a state in which three fingers are brought into contact with a display surface as illustrated in FIG. 31B may be used.

Figure 31B:
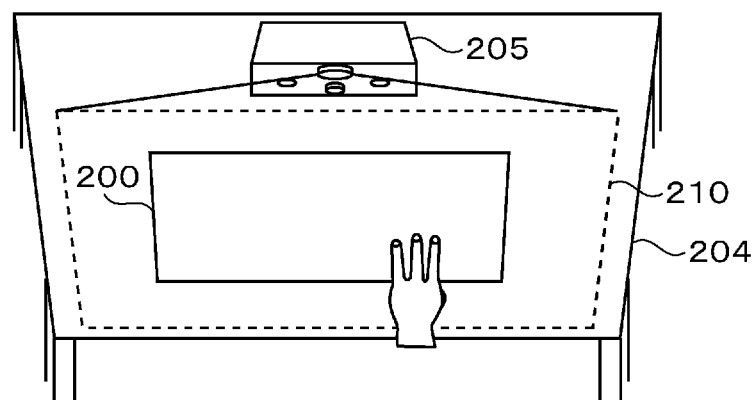
FIG. 31B is a diagram that illustrates an example of an operation of a menu or a detailed information display.

Here, the gestures illustrated in FIGS. 31A and 31B are examples, and any other gesture may be used as long as the gesture can be discriminated from the other operations.

Figure 31C:
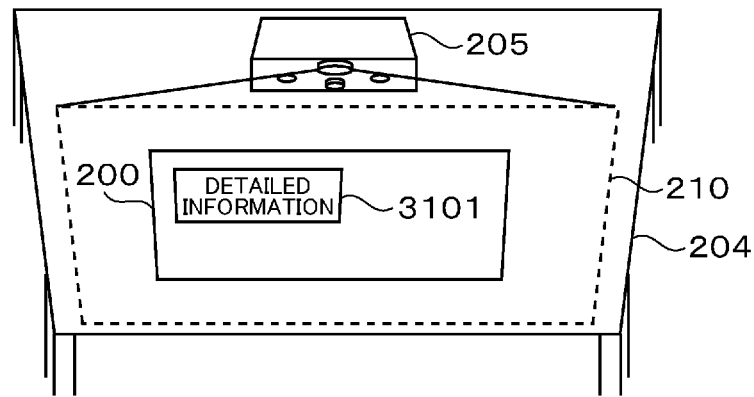
FIG. 31C is a diagram that illustrates an example of an operation of a menu or a detailed information display.

In this embodiment, in a case where the gesture illustrated in FIG. 31A or 31B is detected, a control unit 110 of the projection-type display device 205 determines a detailed information display operation and displays detailed information 3101 as illustrated in FIG. 31C.

In addition, as another example, in a case where the gesture illustrated in FIG. 31A or 31B is detected, the control unit 110 of the projection-type display device 205 determines a menu screen display operation and, as illustrated in FIG. 31D, displays a menu screen 3102.

Furthermore, as another example, in a case where the gesture illustrated in FIG. 31A or 31B is detected, the control unit 110 of the projection-type display device 205 determines an operation for performing both the detailed information display and the menu screen display and may perform the display of the detailed information 3101 illustrated in FIG. 31C and the display of the menu screen 3102 illustrated in FIG. 31D together.

The positions of the display of the detailed information 3101 illustrated in FIG. 31C and the display of the menu screen 3102 illustrated in FIG. 31D may be set inside the display screen 200 or to predetermined neighboring positions. In addition, as another example, the detailed information 3101 or the menu screen 3102 may be displayed at a position corresponding to a finger's contact point of the gesture illustrated in FIG. 31A or a position (the position of a center finger among three fingers) at which the gesture illustrated in FIG. 31B is detected.

As an example of the detailed information 3101, the detailed information may be characteristics (resolution at the time of input, a frame rate, interlaced or progressive, and the like) of a displayed video, and, in a case where supplementary information such as title information is included in an input video, the detailed information may be such information. In addition, in case of a projection-type display device that includes a plurality of input terminals and can receive video inputs from different input sources, the detailed information may be information used for identifying such an input source.

As an example of menu items displayed on the menu screen 3102, a language switching menu for a language used on the menu, an adjustment menu for image qualities such as the brightness, the contrast, and the like of a display video, a trapezoidal correction process menu, and the like may be displayed. In addition, in case of a projection-type display device that includes a plurality of input terminals and can receive video inputs from different input sources, menu items used for switching among the input sources may be displayed.

Next, an example of a case where, after an operation for increasing the number of display screens described with reference to FIGS. 23A and 23B is performed, an individual detailed information display or an individual menu screen display is performed for each display screen will be described with reference to FIGS. 32A and 32B.

Figure 32D:
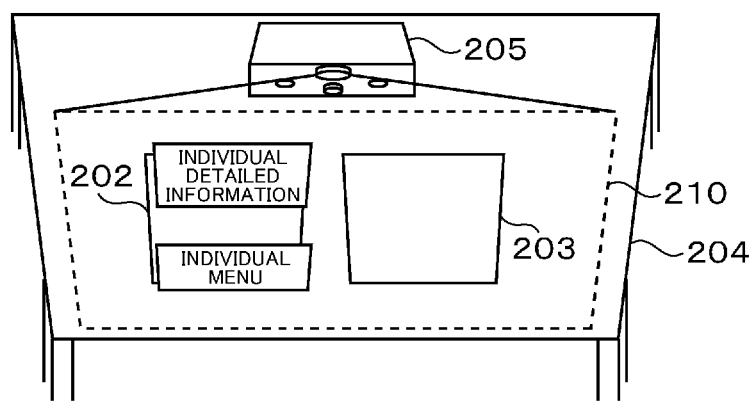
FIG. 32D is a diagram that illustrates an example of an operation of a menu or a detailed information display.

FIGS. 32A and 32B illustrate a gesture for the operation of increasing the number of display screens and a display example thereof as illustrated in FIGS. 23A and 23B, and the description thereof has been presented in Embodiment 1 and thus will not be presented here. FIG. 32C illustrates an example in which the gesture illustrated in FIG. 31A is detected at a position at which a finger's contact point is included inside the display screen 202 out of a plurality of display screens 202 and 203 generated by the operation of increasing the number of display screens. In this case, the control unit 110 of the projection-type display device 205, as illustrated in FIG. 32D, performs an individual detailed information display or an individual menu screen display for the display screen 202 or a display combining these near the display screen 202 (or inside the screen).

In such a case, the individual menu screen illustrated in FIG. 32D displays individual menu items for the display screen 202. For example, an image quality adjustment menu (the image quality adjustment for a display video displayed on the display screen 203 is not performed) for a display video displayed on the display screen 202 may be displayed. In addition, in case of a projection-type display device that includes a plurality of input terminals and can receive video inputs from different input sources, menu items used for switching (switching among the input sources for a display video displayed on the display screen 203 is not performed) among the input sources for a display video displayed on the display screen 202 may be displayed. Furthermore, it is unnatural to perform a trapezoidal correction only for the display screen 202 that is one of the plurality of display screens, and thus, in the individual menu display for the display screen 202, menu items used for the trapezoidal correction may not be displayed or may be configured to be displayed but not to be operated.

Similarly, individual detailed information illustrated in FIG. 32D displays individual detailed information for the display screen 202. Information used for identifying an input source and the like such as the characteristics, title information, and the like of a video displayed on the display screen 202 may be displayed. In case of a projection-type display device that includes a plurality of input terminals and can receive video inputs from different input sources, switching among the input sources can be performed on the menu screen for the display screen 202 illustrated in FIG. 32D. At this time, since the characteristics, the title information, the input sources, and the like of videos displayed on the display screens 202 and 203 are different from each other, it is advantageous to enable a viewer to individually check the detailed information of each display screen.

In the examples illustrated in FIGS. 32A to 32D, as the gesture used for the individual detailed information display or the individual menu screen display, while the example of the gesture illustrated in FIG. 31A is used, the gesture illustrated in FIG. 31B may be used.

Next, an example of a case where, after the rotation operation of the display screen described with reference to FIGS. 22A, 22B, 25A, and 25B is performed, an individual detailed information display or an individual menu screen display for each display screen is performed will be described with reference to FIGS. 33A to 33D.

Figure 33A:
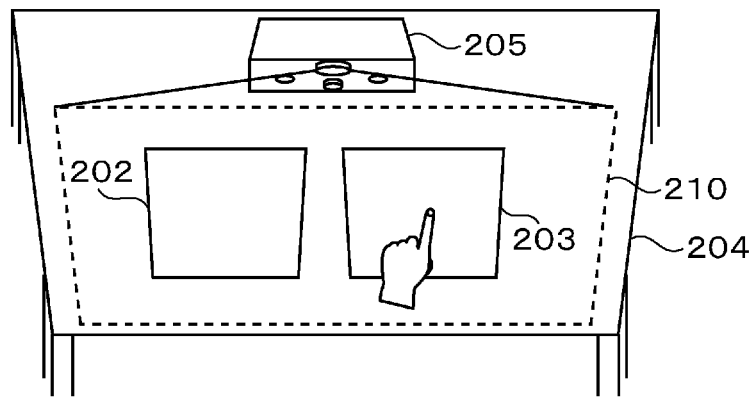
FIG. 33A is a diagram that illustrates an example of an operation of a menu or a detailed information display.
Figure 33B:
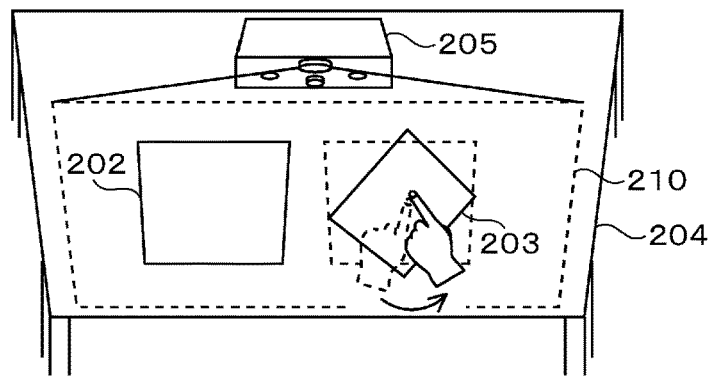
FIG. 33B is a diagram that illustrates an example of an operation of a menu or a detailed information display.
Figure 33C:
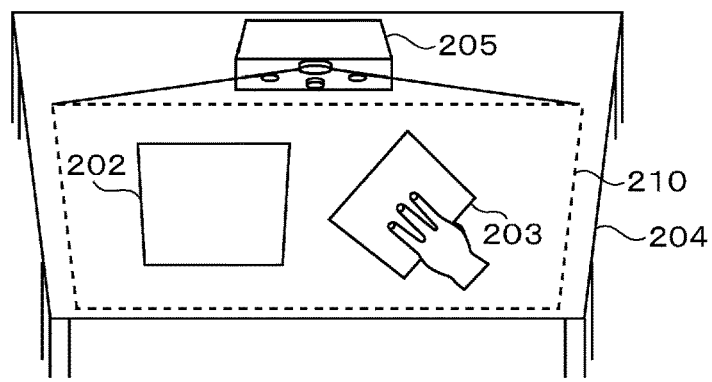
FIG. 33C is a diagram that illustrates an example of an operation of a menu or a detailed information display.
Figure 33D:
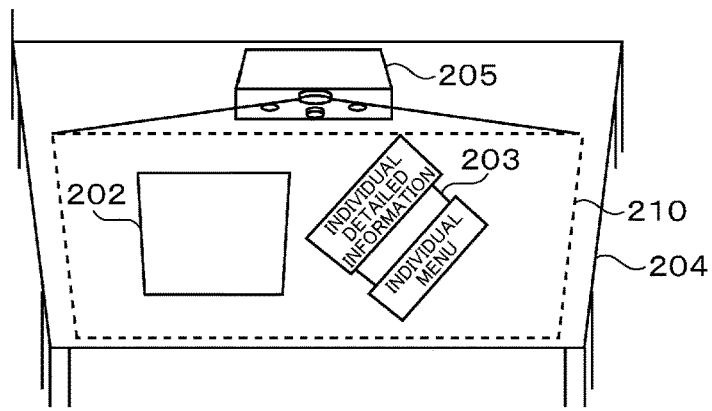
FIG. 33D is a diagram that illustrates an example of an operation of a menu or a detailed information display.

FIGS. 33A and 33B illustrate a gesture for the rotation operation of the display screen and a display example thereof as illustrated in FIGS. 22A and 22B, and the description thereof has been presented in Embodiment 1 and thus will not be presented here. FIG. 33C illustrates an example in which the gesture illustrated in FIG. 31B is detected at a position at which a finger's contact point is included inside the display screen 203 in a state in which one display screen 203 out of a plurality of display screens 202 and 203 is rotated by the rotation operation of the display screen. In this case, the control unit 110 of the projection-type display device 205, as illustrated in FIG. 33D, performs an individual detailed information display or an individual menu screen display for the display screen 203 or a display combining these near the display screen 203 (or inside the screen). At this time, the control unit 110 performs the individual detailed information display or the individual menu screen display at an angle corresponding to the display angle of the display screen 203. The content of the individual detailed information display or the individual menu screen display for the display screen 203 is similar to that of the display screen 202 illustrated in FIGS. 32A to 32D, and the description thereof will not be repeated.

For a rotated displayed screen, there is a high possibility that a viewer present at a position for easy viewing the display screen performs an individual detailed information display or an individual menu screen display through a gesture operation. Accordingly, as illustrated in FIG. 33D, by performing the individual detailed information display or the individual menu screen display at an angle corresponding to the angle of the display screen, there is an advantage that a viewer can easily operate the viewing screen.

In the examples illustrated in FIGS. 33A to 33D, as the gesture used for the individual detailed information display or the individual menu screen display, while the example of the gesture illustrated in FIG. 31B is used, the gesture illustrated in FIG. 31A may be used.

Next, an example will be described with reference to FIGS. 34A to 34D in which, in a case where a plurality of display screens are displayed, not an individual menu for each screen but a whole menu for all the display screens at its targets is displayed. In the example illustrated in FIGS. 34A to 34D, as a gesture used for displaying the whole menu, similar to the examples illustrated in FIGS. 32A to 32D and FIGS. 33A to 33D, while a gesture similar to that illustrated in FIG. 31A or 31B is used, the detection position of the gesture is different from that of the examples illustrated in FIGS. 32A to 32D and FIGS. 33A to 33D. For example, in a case where a finger's contact point of the gesture illustrated in FIG. 31A is detected outside the plurality of display screens, a gesture for starting the whole menu display is determined. Similarly, in a case where three fingers in a gesture similar to that illustrated in FIG. 31B are detected outside the plurality of display screens, a gesture for starting the whole menu display is determined. Hereinafter, more specific description will be presented with reference to drawings.

In the example illustrated in FIG. 34A, a projection-type display device 205 displays a display screen 202 and a display screen 203 on a desk 204. Here, the gesture illustrated in FIG. 31A is detected, and a finger's contact point is detected at a position not inside the display screen 202 and the display screen 203. In this case, a control unit 110 of the projection-type display device 205, as illustrated in FIG. 34B, displays a whole menu 3401 by controlling a display control unit 111. In addition, whole detailed information 3402 that is detailed information for the whole screen may be displayed.

Here, as menu items of the whole menu 3401, a menu of whole image quality adjustment that simultaneously performs image quality adjustment for the display videos displayed on all the display screens may be displayed. In addition, menu items used for switching among languages used on the whole menu may be displayed. Furthermore, a menu item of the trapezoidal correction that cannot be used in the individual menu display of each individual screen may be configured to be usable on the whole menu 3401.

As an example of the whole detailed information 3402, there is the number of display screens or the like. In addition, in case of a projection-type display device that includes a plurality of input terminals and can receive video inputs from different input sources, a plurality of display screens and a list of input sources may be displayed.

In addition, in the example illustrated in FIG. 34A, the gesture illustrated in FIG. 31B may be used in place of the gesture illustrated in FIG. 31A.

Figure 34C:
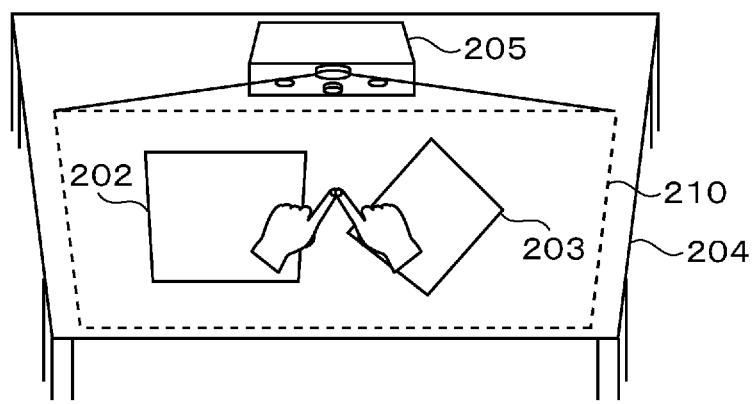
FIG. 34C is a diagram that illustrates an example of an operation of a menu or a detailed information display.
Figure 34D:
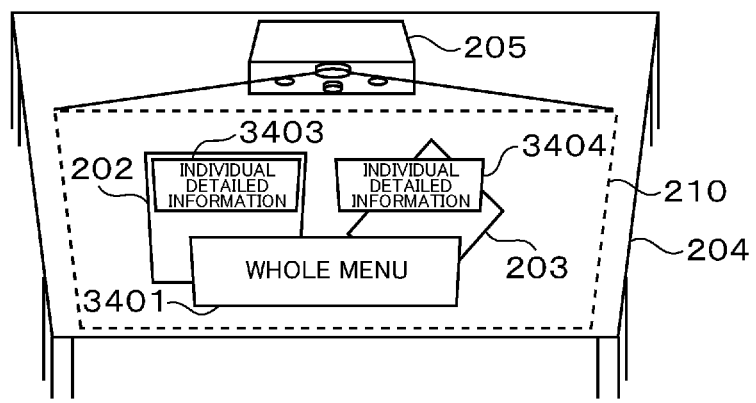
FIG. 34D is a diagram that illustrates an example of an operation of a menu or a detailed information display.

Next, in the example illustrated in FIG. 34C, the projection-type display device 205 displays the display screen 202 and the display screen 203 on the desk 204 and displays the display screen 203 at an angle different from that of the display screen 202 through a rotation process. Here, the gesture illustrated in FIG. 31A is detected, and all the finger's contact points are detected at a position not inside the display screen 202 and the display screen 203. In this case, the control unit 110 of the projection-type display device 205, as illustrated in FIG. 34D, displays the whole menu 3401 by controlling the display control unit 111. In addition, as in the display example illustrated in FIG. 34D, at this time, the individual detailed information 3403 and 3404 may be displayed for a plurality of display screens.

Here, in the example illustrated in FIG. 33D, when the individual detailed information is displayed, the individual detailed information is displayed at an angle corresponding to the display angle of the individual display screen. In contrast to this, as in FIG. 34D, in a case where the whole menu 3401 is displayed, it is preferable that the individual display screen is displayed at the same angle as the display angle of the whole menu 3401 regardless of the display angle of the individual display screen 203 so as to be easily seen by an operator of the whole menu 3401.

In the description presented above, in the example illustrated in FIG. 34B, while the whole detailed display is performed together with the whole menu display, and, in the example illustrated in FIG. 34D, the individual information display is performed together with the whole menu display, any one of the displays may be performed. In addition, only the whole menu may be displayed. Furthermore, all the whole menu display, the whole detailed display, and the individual detailed information display may be performed.

In addition, on the menu screen (the individual menu screen and the whole menu screen) described in this embodiment, a menu item used for setting On/Off of each gesture recognition function described in each embodiment may be arranged. For example, all the gesture recognition functions may be turned off. In such a case, the projection-type display device 205 is operated based on an operation signal corresponding to a button operation for a remote controller or a main body. The recognition process for a one-finger moving gesture illustrated in FIG. 21A, the recognition process for a one-finger rotation gesture illustrated in FIG. 21B, and the like may be configured to be individually turned off. It is effective in a case where there is a possibility of erroneous recognition at the time of description using a bar or the like.

In addition, in a rotation operation, a menu item used for selecting recognition of the one-finger rotation gesture illustrated in FIG. 21B or the two-finger rotation gesture illustrated in FIGS. 25A and 25B may be displayed. As above, depending on the situations, there are cases where it is advantageous to individually set On/Off of each gesture recognized by the projection-type display device 205. In such cases, for example, On/Off may be configured to be settable for all the gestures illustrated in FIG. 21A and subsequent diagrams on the menu screen. In case of the individual menu screen, the On/Off setting of such gestures may be applied to only a corresponding display screen.

According to the detailed information display and the menu display of this embodiment described above, a detailed information display and a menu display having improved usability for a viewer can be performed.

REFERENCE SIGNS LIST

100 Camera
101, 102 Illumination
104 Shadow area extracting unit
105 Feature point detecting unit
106 Approaching degree detecting unit
107 Contact point detecting unit
108 Contour detecting unit
109 Direction detecting unit
110 Control unit
111 Display control unit
112 Drive circuit unit
113 Input terminal
114 Input signal processing unit
115 Projection unit
201 Projection-type display device
202, 203 Display screen
204 Projection object
205 Projection-type display device provided with operation detecting function
3 User
30, 31, 32 Finger
401, 402, 403, 404, 405 Shadow
501, 502 Contour line
601, 602 Feature point
700, 701, 702, 703 Pointing direction
800 Pointer
P Contact point

The invention claimed is:

1. A projection-type video display device comprising:
a video projector that projects a video;
at least one light source that emits illumination light different from that of the projected video onto a surface at least partly overlapping a video projection surface onto which the video projector projects the video;
an image capture device that performs imaging using reflected light of the illumination light; and
a control system that is communicatively coupled to the video projector, the at least one light source and the image capture device, wherein the control system:
detects at least a position at which an operator's finger is brought into contact with the video projection surface based on a captured image acquired by the image capture device; and
performs a plurality of operations that change at least one partial video included in the video projected by the video projector based on a result of the detection acquired by the control system, wherein, the plurality of operations include a first operation and a second operation;
wherein the first operation comprises:
dividing a first partial video of video projected by the video projector into a plurality of separate display screens, on a condition that the operator's finger is detected to move into the first partial video from outside of the first partial video and traverses the partial video while being brought into contact with the video projection surface; and
allowing each of new partial video contents of the separate display screens to be independently adjustable through interaction of each of the separate display screens, and wherein the second operation comprises:
on a condition that the operator's finger is detected to move from a start position in a second partial video while being brought into contact with the video projection surface, moving the second partial video of video projected by the video projector.

2. The projection-type video display device of claim 1, further comprising a input signal processor,
wherein the video projector projects a list of input sources to be inputted to the input signal processor for selecting the content of the separate display screens.

3. The projection-type video display device of claim 1, wherein the control system detects the position at which the operator's finger is brought into contact with the video projection surface based on a feature of at least one shadow found in the captured image.

4. The projection-type video display device of claim 1, wherein the at least one light source includes two light sources, and
the control system detects the position at which the operator's finger is brought into contact with the video projection surface based on features of two different shadows cast by the operator's finger on the video projection surface.

* * * * *